United States Patent
Holt et al.

(10) Patent No.: US 11,853,808 B2
(45) Date of Patent: Dec. 26, 2023

(54) VISUAL CLUSTER DEPLOYMENT AND OPERATION SYSTEM AND METHOD

(71) Applicant: harpoon Corp., Menifee, CA (US)

(72) Inventors: Dominic Holt, Menifee, CA (US); Manuel Gauto, Annandale, VA (US); Mathew Jackson, Highlands Ranch, CO (US)

(73) Assignee: HARPOON CORP., Menifee, CA (US)

( * ) Notice: Subject to any disclaimer, the term of this patent is extended or adjusted under 35 U.S.C. 154(b) by 0 days.

(21) Appl. No.: 18/101,847

(22) Filed: Jan. 26, 2023

(65) Prior Publication Data
US 2023/0251910 A1 Aug. 10, 2023

Related U.S. Application Data

(60) Provisional application No. 63/308,110, filed on Feb. 9, 2022.

(51) Int. Cl.
*G06F 9/50* (2006.01)
*G06F 3/0486* (2013.01)

(52) U.S. Cl.
CPC .......... *G06F 9/5077* (2013.01); *G06F 3/0486* (2013.01); *G06F 9/5072* (2013.01); *G06F 2209/505* (2013.01)

(58) Field of Classification Search
CPC .... G06F 9/5077; G06F 3/0486; G06F 9/5072; G06F 2209/505
See application file for complete search history.

(56) References Cited

U.S. PATENT DOCUMENTS

| | | | |
|---|---|---|---|
| 11,347,806 B2 * | 5/2022 | Tal | G06F 16/178 |
| 2015/0134716 A1 | 5/2015 | Nugent | |
| 2019/0028360 A1 * | 1/2019 | Douglas | H04L 41/22 |
| 2020/0228402 A1 | 7/2020 | Parker et al. | |
| 2021/0117217 A1 * | 4/2021 | Croteau | G06F 11/302 |
| 2021/0200814 A1 | 7/2021 | Tal et al. | |
| 2021/0224122 A1 * | 7/2021 | Glass | H04L 67/1031 |
| 2021/0382632 A1 | 12/2021 | Dontu et al. | |
| 2022/0012030 A1 | 1/2022 | Wang | |

(Continued)

OTHER PUBLICATIONS

Search Report for International Patent Application PCT/US23/11618, dated Apr. 13, 2023, 12 pages.

*Primary Examiner* — Sisley N Kim
(74) *Attorney, Agent, or Firm* — Fresh IP PLC; Emily Do; John R. Bednarz

(57) ABSTRACT

A method includes receiving a request to set up a computing cluster comprising at least one node, the request comprising a selection of a node graphical user interface element that represents at least one virtual machine associated with at least one of at least one cloud service provider and at least one on-premise computing device, dynamically generating a configuration file comprising configuration language to set up the computing cluster comprising the at least one node, parsing the configuration file to convert the configuration file into at least one application programming interface (API) request and sending the at least one API request to the least one of the at least one cloud service provider and the at least one on-premise computing device to set up the computing cluster, and receiving real-time deployment information.

19 Claims, 37 Drawing Sheets

(56) References Cited

U.S. PATENT DOCUMENTS

| | | | |
|---|---|---|---|
| 2022/0188170 A1* | 6/2022 | Smith | G06F 9/547 |
| 2022/0191168 A1* | 6/2022 | Snehashis | H04L 41/22 |
| 2023/0035600 A1* | 2/2023 | Holzman | G06F 8/71 |
| 2023/0049167 A1* | 2/2023 | Wilson | G06F 40/279 |
| 2023/0107891 A1* | 4/2023 | Miriyala | G06F 9/5044 |
| | | | 370/254 |

* cited by examiner

FIG. 20

VISUAL CLUSTER DEPLOYMENT AND OPERATION SYSTEM AND METHOD

CROSS REFERENCE TO RELATED APPLICATION

This application is related to and claims priority under 35 U.S.C. § 119(e) to U.S. Patent Application No. 63/308,110, filed Feb. 9, 2022, entitled "Visual Cluster Deployment and Operation System and Method," the entire contents of which is incorporated herein by reference.

BACKGROUND

It can be extremely difficult to build and deploy cloud and on-premise infrastructure. Deployment and management of distributed, scalable, and production-grade computing clusters is particularly difficult. Once a cluster of cloud computing resources is running, it can be even more difficult to maintain the cluster or make changes. In most instances, a user may have to receive specialized training and skillsets just to start and maintain a cluster. It can take months to a year or more just to develop automated scripts to deploy a production cluster of compute resources. In addition, it often is very time consuming to perform a function on the cluster.

It is with these issues in mind, among others, that various aspects of the disclosure were conceived.

SUMMARY

The present disclosure is directed to a visual cluster deployment and operation system and method. A system may include a client computing device that communicates with a server computing device to set up a computing cluster without code or scripting. A user may use a graphical user interface (GUI) to select nodes and other elements to add to the computing cluster by dragging and dropping the nodes and elements and connecting the nodes and elements. The computing cluster may be based on virtual machines associated with one or more cloud computing services and one or more on-premise computing devices. The client computing device may use a graphical user interface (GUI) to set up one or more nodes associated with the cluster, select one or more code repositories and containers to be attached to the one or more nodes, and deploy the one or more nodes using the cloud computing services or the one or more on-premise computing devices. As an example, a user may use the GUI to deploy the one or more nodes and a server computing device may generate one or more configuration files that are used to automatically configure and set up the cloud computing cluster. In one example, the user may set up one of a git element and a container element and attach the one of the git element and the container element to the one or more nodes associated with the cluster. As an example, the git repository may be built with a text file or can be built using commands and an associated operating system to build the repository.

In one example, a system may include a memory storing computer-readable instructions and at least one processor to execute the instructions to receive a request to set up a computing cluster comprising at least one node, the request comprising a selection of a node graphical user interface element that represents at least one virtual machine associated with at least one of at least one cloud service provider and at least one on-premise computing device, dynamically generate a configuration file comprising configuration language to set up the computing cluster comprising the at least one node, parse the configuration file to convert the configuration file into at least one application programming interface (API) request and send the at least one API request to the at least one of the at least one cloud service provider and the at least one on-premise computing device to set up the computing cluster, receive real-time deployment information from the at least one of the at least one service provider and the at least one on-premise computing device, and transmit status information associated with the computing cluster for display.

In another example, a method may include receiving, by at least one processor, a request to set up a computing cluster comprising at least one node, the request comprising a selection of a node graphical user interface element that represents at least one virtual machine associated with at least one of at least one cloud service provider and at least one on-premise computing device, dynamically generating, by the at least one processor, a configuration file comprising configuration language to set up the computing cluster comprising the at least one node, parsing, by the at least one processor, the configuration file to convert the configuration file into at least one application programming interface (API) request and sending the at least one API request to the at least one of the at least one cloud service provider and the at least one on-premise computing device to set up the computing cluster, receiving, by the at least one processor, real-time deployment information from the at least one of the at least one service provider and the at least one on-premise computing device, and transmitting, by the at least one processor, status information associated with the computing cluster for display.

In another example, a non-transitory computer-readable storage medium includes instructions stored thereon that, when executed by a computing device cause the computing device to perform operations, the operations including receiving a request to set up a computing cluster comprising at least one node, the request comprising a selection of a node graphical user interface element that represents at least one virtual machine associated with at least one of at least one cloud service provider and at least one on-premise computing device, dynamically generating a configuration file comprising configuration language to set up the computing cluster comprising the at least one node, parsing the configuration file to convert the configuration file into at least one application programming interface (API) request and sending the at least one API request to the at least one of the at least one cloud service provider and the at least one on-premise computing device to set up the computing cluster, receiving real-time deployment information from the at least one of the at least one service provider and the at least one on-premise computing device, and transmitting status information associated with the computing cluster for display.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 4-36 show user interface elements and/or a graphical user interface (GUI) displayed by a visual cluster deployment and operation application according to an example of the instant disclosure.

DETAILED DESCRIPTION

Figure 1:
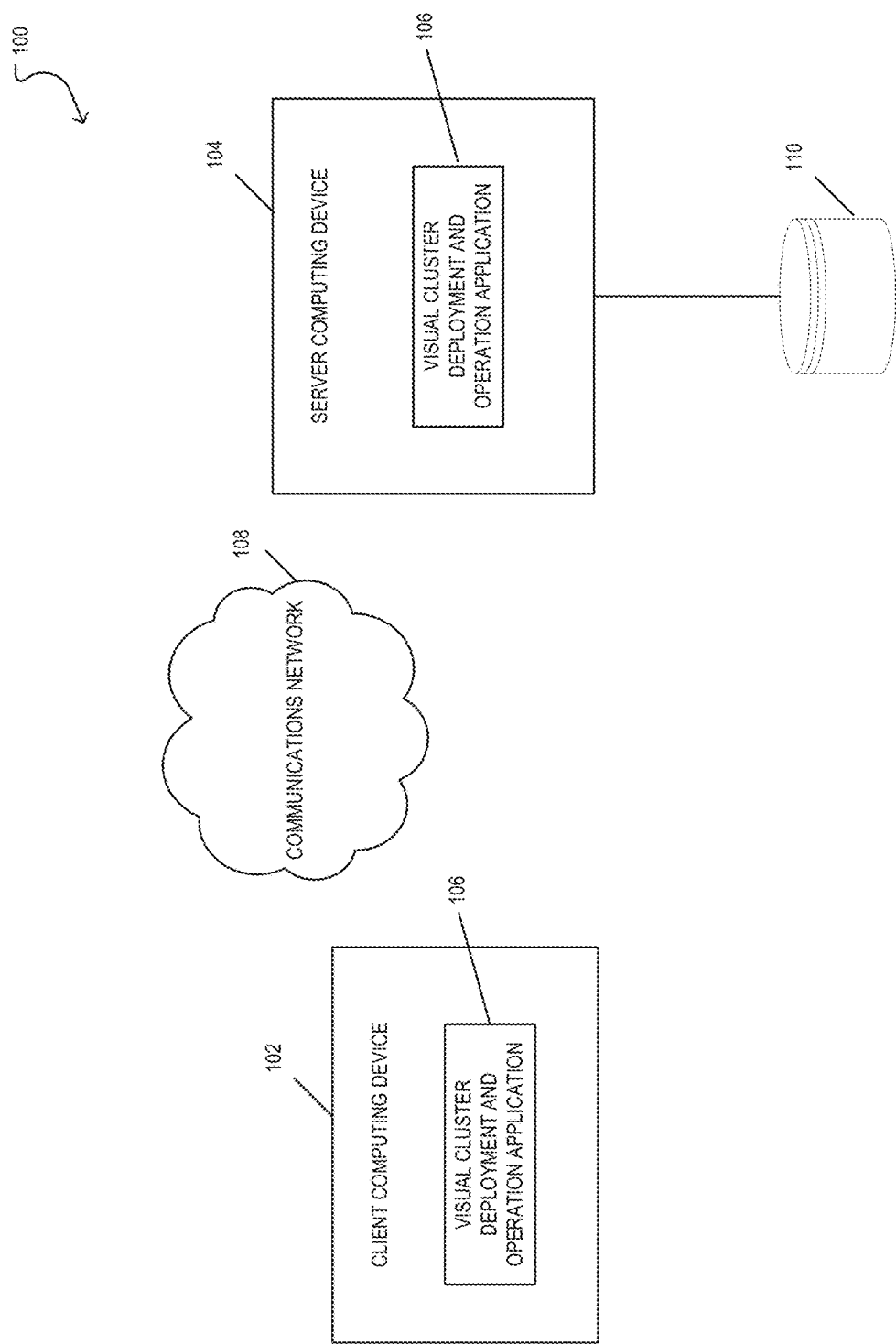
FIG. 1 is a block diagram of a visual cluster deployment and operation system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Aspects of a visual cluster deployment and operation system includes a client computing device that communicates with a server computing device to set up a computing cluster. In one example, the server computing device may receive a request to set up a computing cluster comprising at least one node, the request comprising a selection of a node graphical user interface element that represents at least one virtual machine associated with at least one of at least one cloud service provider and at least one on-premise computing device, dynamically generate a configuration file comprising configuration language to set up the computing cluster comprising the at least one node, parse the configuration file to convert the configuration file into at least one application programming interface (API) request and send the at least one API request to the at least one of the at least one cloud service provider and the at least one on-premise computing device to set up the computing cluster, receive real-time deployment information from the at least one of the at least one service provider and the at least one on-premise computing device, and transmit status information associated with the computing cluster for display by the client computing device.

It can be very difficult to build and deploy cloud infrastructure automatically, especially deployment and management of KUBERNETES clusters. KUBERNETES is an open source system with hundreds of different interworking components. Setting up a cluster that is to be used in a production environment may be a very complicated task. In addition, once the cluster is running, it can be difficult to build custom configuration files using YAML to scale up and/or down, open ingress/egress routes, create Config-Maps, and perform secrets management, among others.

Specialized training and skills are required to setup a cluster involving KUBERNETES and cloud automation. Setting up an automated production cluster using infrastructure as code has been known to take nine to twelve months. The system discussed herein can setup a cluster in five to ten minutes. In addition, performing functions on the cluster has conventionally taken hours or even days. The system can perform functions on the cluster in seconds.

The system may connect to multiple software repositories and a user may search for certain repositories, libraries, container images, or other artifacts. Search results may be displayed for the user. The user can drag and drop a particular selection using a graphical user interface (GUI) that may be known as an infrastructure visual display (IVD). The IVD can be used to setup a cluster and cloud hardware and infrastructure on one or more cloud service providers and on-premise hardware using the IVD. The user does not have to provide any scripts or code to the system. The user can select one or more nodes to add to the cluster, start the one or more nodes, connect the one or more nodes to other computing elements, and deploy the cluster. The system may automatically deploy the cluster to cloud hardware and infrastructure and on-premise hardware without scripts and code provided by the user. The user also can use the IVD to maintain and manage the cluster and deployments to the cluster using the IVD and by providing input to the IVD. As a result, the system may allow dynamic deployment of workloads to the cluster without code or configuration on the part of the user.

FIG. 1 is a block diagram of a visual cluster deployment and operation system 100 according to an example of the instant disclosure. As shown in FIG. 1, the system 100 may include at least one client computing device 102 as well as at least one server computing device 104. The client computing device 102 and the server computing device 104 may have a visual cluster deployment and operation application 106. As an example, there may be a server-side component of the visual cluster deployment and operation application 106 as well as a client-side component of the visual cluster deployment and operation application 106. The at least one server computing device 104 may be in communication with at least one database 110.

The client computing device 102 and the server computing device 104 may have the visual cluster deployment and operation application 106 that may be a component of an application and/or service executable by the at least one client computing device 102 and/or the server computing device 104. For example, the visual cluster deployment and operation application 106 may be a single unit of deployable executable code or a plurality of units of deployable executable code. According to one aspect, the visual cluster deployment and operation application 106 may include one or more components that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The visual cluster deployment and operation system 100 also may include a relational database management system (RDBMS) or another type of database management system such as a NoSQL database system that stores and communicates data from at least one database 110. The data stored in the at least one database 110 may be associated with one or more users associated with the system as well as one or more projects created by each of the one or more users. As discussed herein, each project may be associated with a computing cluster. Each project may have one or more nodes that may execute one or more code repositories or containers. Each user may have username/password information for use with the system as well as username/password information associated with cloud computing services as well as third party services such as code repository services.

The at least one client computing device 102 and the at least one server computing device 104 may be configured to receive data from and/or transmit data through a communication network 108. Although the client computing device 102 and the server computing device 104 are shown as a single computing device, it is contemplated each computing device may include multiple computing devices.

The communication network 108 can be the Internet, an intranet, or another wired or wireless communication network. For example, the communication network may include a Mobile Communications (GSM) network, a code division multiple access (CDMA) network, 3rd Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The client computing device 102 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 102 further includes at least one communications interface to transmit and receive communications, messages, and/or signals.

The client computing device 102 could be a programmable logic controller, a programmable controller, a laptop computer, a smartphone, a personal digital assistant, a tablet computer, a standard personal computer, or another processing device. The client computing device 102 may include a display, such as a computer monitor, for displaying data and/or graphical user interfaces. The client computing device 102 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 104 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 104 further includes at least one communications interface to transmit and receive communications, messages, and/or signals.

Figure 2:
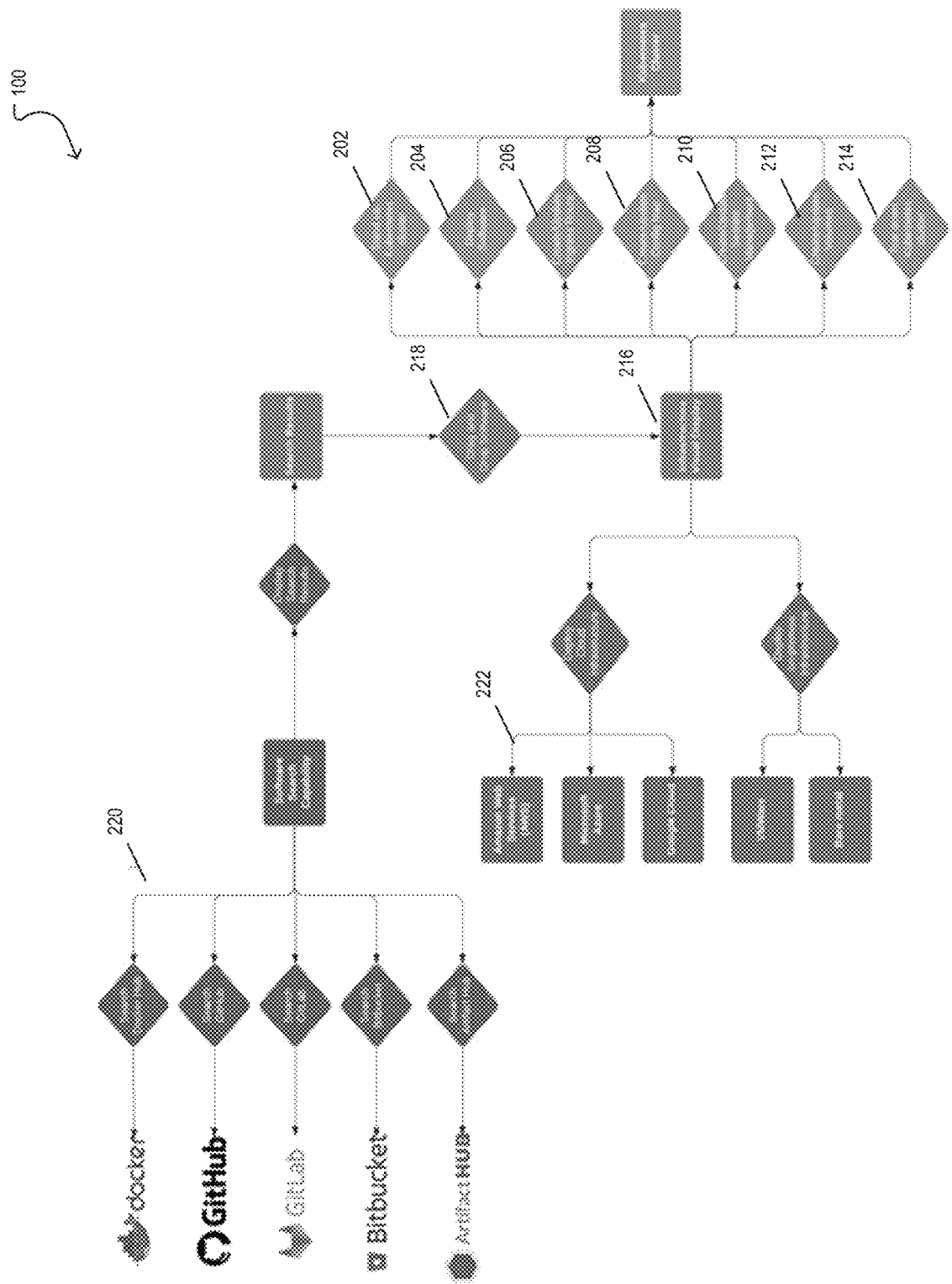
FIG. 2 is another block diagram of the visual cluster deployment and operation system according to an example of the instant disclosure.

FIG. 2 is another block diagram of the visual cluster deployment and operation system 100 according to an example of the instant disclosure. As shown in FIG. 2, a user of the client computing device 102 may set up or stand up a KUBERNETES computing cluster 202 using the visual cluster deployment and operation application 106. The user may deploy software to the computing cluster 204, create/update an ingress route to the computing cluster 206, create/update a ConfigMap 208, create/update secrets management 210, create/update volumes 212, and/or tear down the computing cluster 214, among others.

In one example, the user may view a graphical user interface (GUI) or an infrastructure visual display (IVD) 216 of the computing cluster. The IVD may allow the user to drag and drop one or more elements 218 to set up, modify, and maintain the computing cluster. As an example, the user may connect a user account associated with the system with one or more third-party systems 220 including DOCKER, Harbor, GITHUB, GITLAB, BITBUCKET, and ArtifactHub, among others. The user may search public and private libraries and repositories available on these services. In addition, the user may connect their user account for the system with one or more cloud computing services 222 including AMAZON Web Services (AWS), MICROSOFT AZURE, and GOOGLE CLOUD, among others. In addition, the user may connect their user account for the system with on-premise infrastructure associated with VMWARE, and bare metal or on-premise computing devices. As a result, a user may utilize the system 100 to set up a computing cluster and may deploy the computing cluster on cloud infrastructure and/or on-premise infrastructure by providing input to the GUI and without having to provide any scripting or code.

Figure 3:
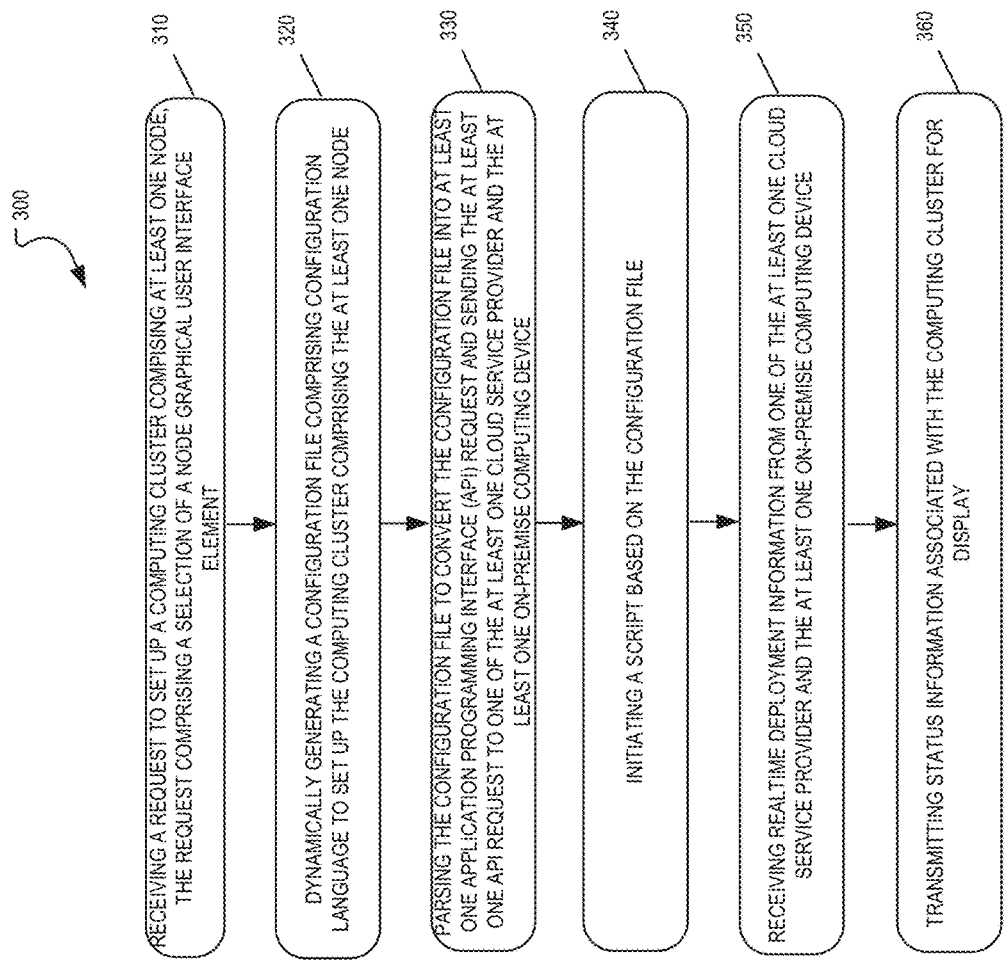
FIG. 3 is a flowchart of a method of setting up a computing cluster by the visual cluster deployment and operation system according to an example of the instant disclosure.

FIG. 3 illustrates an example method 300 of setting up a computing cluster according to an example of the instant disclosure. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 may include receiving a request to set up a computing cluster comprising at least one node, the request comprising a selection of a node graphical user interface element that represents at least one virtual machine associated with one of at least one cloud service provider and at least one on-premise computing device at block 310. The computing cluster may be a Kubernetes cluster among others.

Next, according to some examples, the method 300 may include dynamically generating a configuration file comprising configuration language to set up the computing cluster comprising the at least one node at block 320. As an example, the configuration file may be a HashiCorp Configuration Language (HCL) configuration file or another type of declarative configuration file.

Next, according to some examples, the method 300 may include parsing the configuration file to convert the configuration file into at least one application programming interface (API) request and sending the at least one API request to one of the at least one cloud service provider and the at least one on-premise computing device to set up the computing cluster at block 330.

Next, according to some examples, the method 300 may include initiating a script based on the configuration file at block 340. As an example, the script may be a TERRAFORM script.

Next, according to some examples, the method 300 may include receiving real-time deployment information from one of the at least one service provider and the at least one on-premise computing device at block 350.

Next, according to some examples, the method 300 may include transmitting status information associated with the computing cluster for display by the client computing device 102 at block 360. As an example, the status information may be a particular color of the node graphical user interface element. The particular color may be one of translucent that indicates no status, yellow that indicates in progress, blue that indicates successful deployment, and red that indicates failed deployment, among others.

In some examples, the method 300 may include receiving a request to set up at least one of a git element and a container element and attaching the at least one of the git element and the container element to the node graphical user interface element. As an example, the container element may be a visual representation of a container image to be deployed to the computing cluster. As another example, the git element can be associated with a git repository, is built with a text-based set of instructions, and is built with a user selected operating system.

In some examples, the method 300 may include receiving a request to attach the node graphical user interface element with at least one other element using a link graphical user interface element that is dragged from the node graphical user interface element to the at least one other element.

In some examples, the method 300 may include receiving a request to set up a ConfigMap element and attaching the ConfigMap element to the at least one of the git element and the container element.

In some examples, the method 300 may include receiving a request to set up a volume element comprising a Kubernetes Persistent Volume Claim (PVC).

In some examples, the method 300 may include receiving a request to set up an ingress route element comprising a Kubernetes Ingress Route that is attached to the at least one of the git element and the container element.

In some examples, the method 300 may include receiving a request to set up a secret element comprising a Kubernetes secrets storage that is attached to one of the git element and the container element.

In some examples, the method 300 may include displaying a log associated with the computing cluster.

In some examples, the method 300 may include receiving a selection of a new project user interface element and associating the at least one node with a new project.

FIGS. 4-36 show user interface elements and/or a graphical user interface (GUI) displayed by the visual cluster deployment and operation application 106 according to an example of the instant disclosure.

Figure 4:
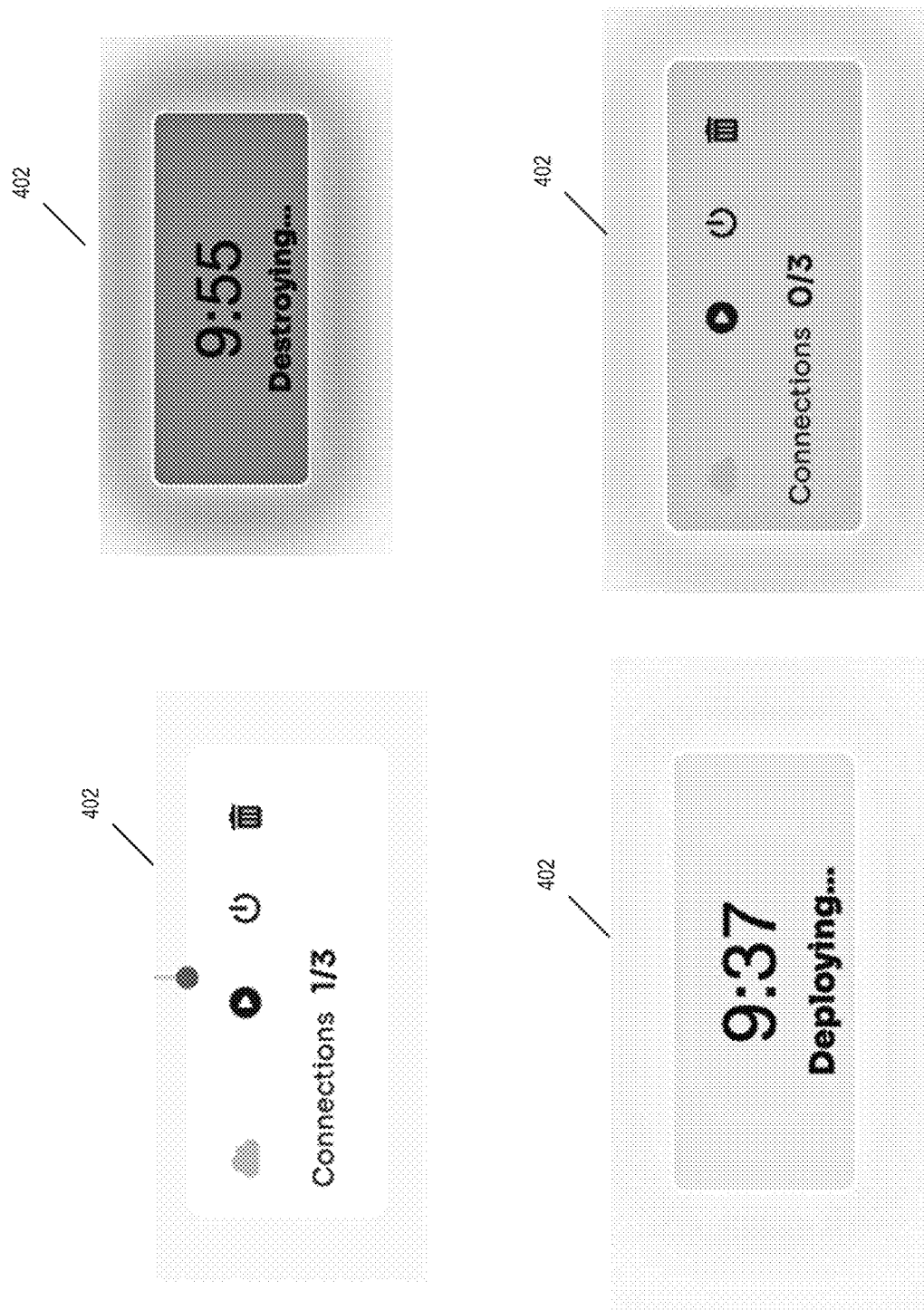

FIG. 4 shows example user interface elements 402 that may represent a node element according to an example of the instant disclosure and indicates examples of cluster start up and cluster tear down for one or more nodes. As an example, the node element may visually represent a state of the node element. Translucent or a first color may represent no state and that the node is waiting to be activated. Yellow or a second color may represent that the element is in the process of being deployed. Blue or a third color may represent a successful deployment and that the node is running successfully. Red or a fourth color may represent a failed deployment and error state for the node. Other colors may be possible and may represent another state of the node element.

The node element is a visual representation of a virtual machine that may be running inside or within a user's cloud service provider account. Multiple nodes may represent a cluster. The cluster may be scaled up by selecting one or more available nodes available to the user. The cluster set up may start with selection of a play button that may initiate TERRAFORM scripts that may build a cluster using one or more cloud service providers and/or an on-premise environment.

The cluster may be stopped with selection of a stop button that may initiate TERRAFORM scripts to tear down the cluster and any resources that may be associated with the cluster. Elements may be attached to a given node until resource constraints are reached on a node.

As an example, the client computing device 102 may send one or more requests to the server computing device 104 that may execute and perform one or more requests. The node element may be mapped to one or more computing devices that may represent a KUBERNETES cluster. The server computing device 104 may manage the one or more computing devices and supporting infrastructure using configuration language. The configuration language may be HashiCorp Configuration Language (HCL) that may be in a declarative configuration file.

The server computing device 104 may dynamically generate input for the HCL based on requests from the user. The input may be injected into the execution environment using environment variables. The server computing device 104 may execute TERRAFORM within the environment by copying the HCL files into a temporary directory, injecting the saved state for Terraform, setting up the environment variables and executing Terraform. The server computing device 104 may capture output from Terraform to determine if there are one or more errors and communicate progress to the client computing device 102. Once complete, the server computing device 104 may save or store output including secrets and state for use when changes are to be made to the cluster. The deployed cluster may have a set of base services that may be deployed and configured to dynamically interact with one or more cloud computing providers to allow for automated provisioning of volumes, services, and other cloud services in the cluster. This may allow features such as autoscaling as well as other features that may be associated with the cloud provider and the cluster managed by the server computing device 104.

Figure 5:
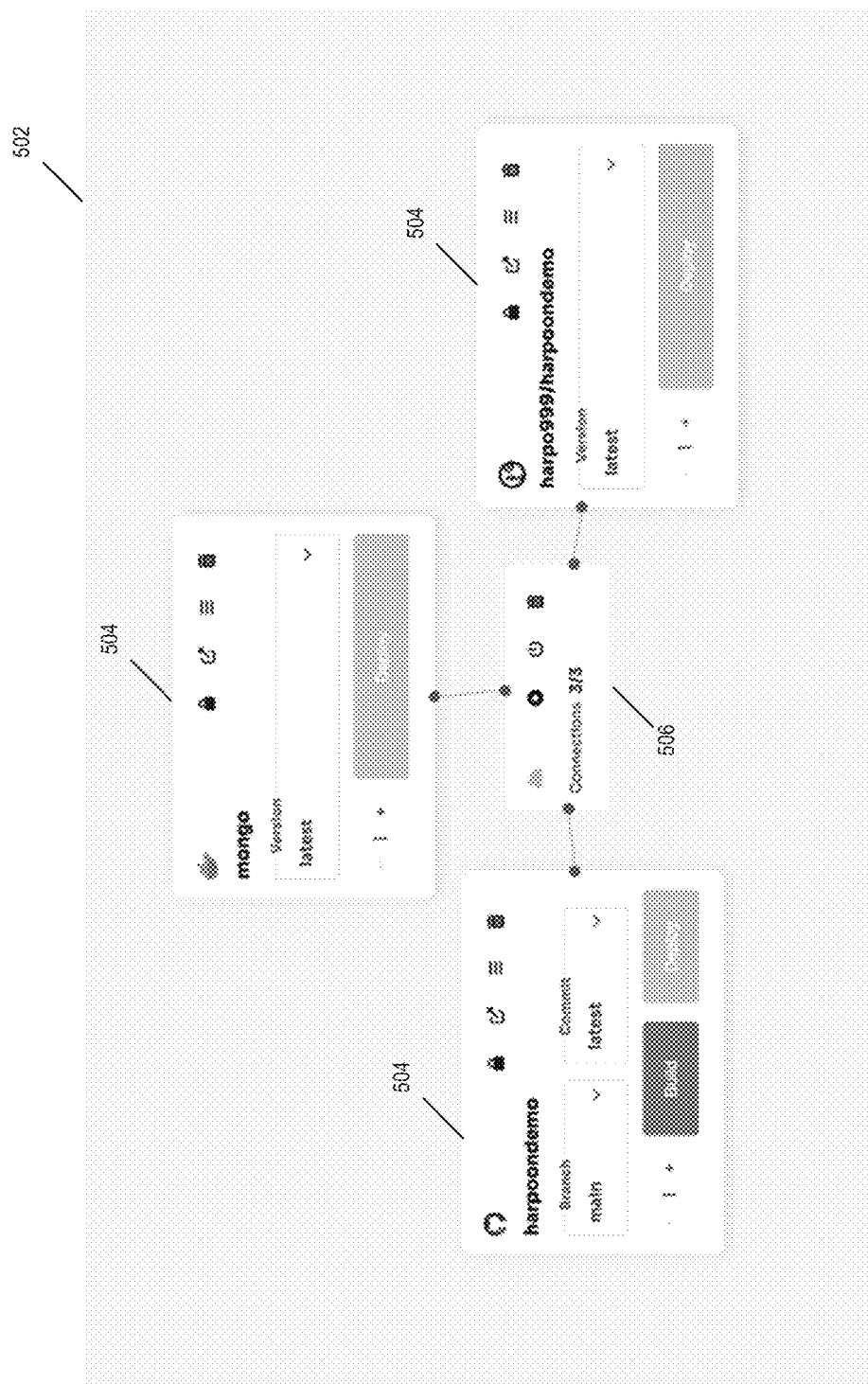

FIG. 5 shows a screenshot 502 of an example graphical user interface of the IVD according to an example of the instant disclosure. As shown in FIG. 5, the node element may have three different elements 504 that are attached to the node 506. In this case, there is a GITHUB element, a DOCKER container element, and a HARBOR element that are attached to the node 506.

Figure 6:
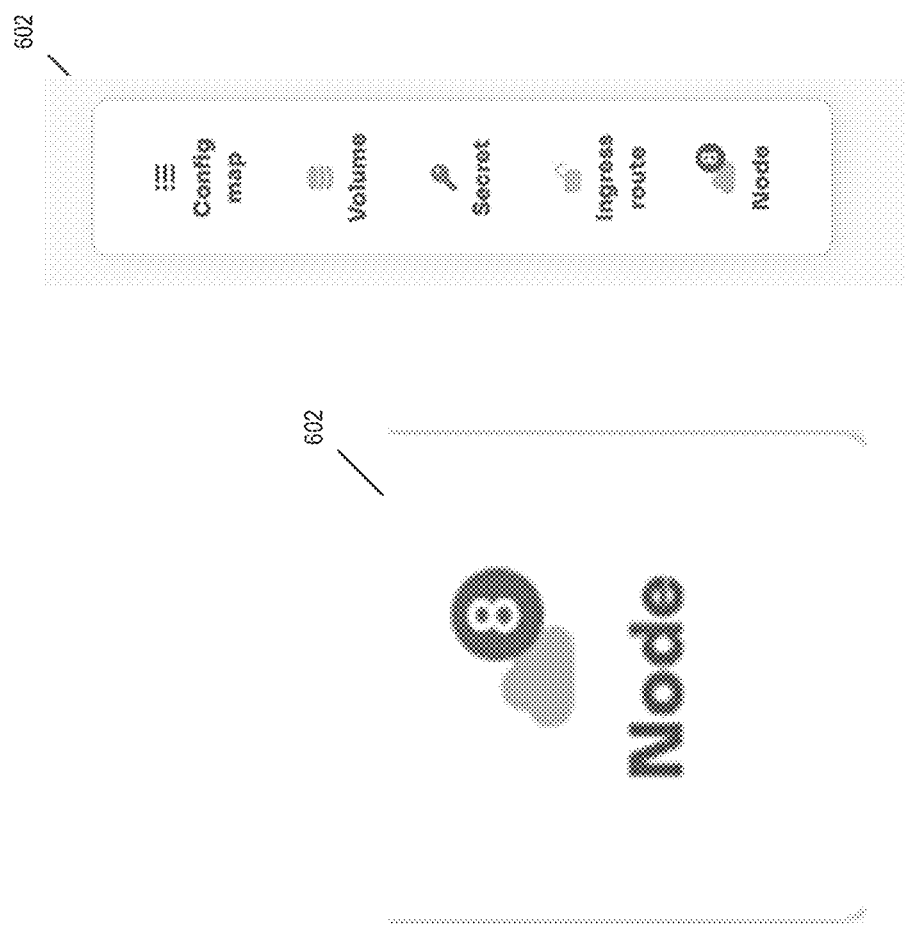

FIG. 6 shows a user interface element 602 associated with a node element according to an example of the instant disclosure. As shown in FIG. 6, there are eight nodes available as indicated by a badge. The badge may be displayed as part of a menu that may include a Config map GUI element, a Volume GUI element, a Secret GUI element, an Ingress route GUI element, and the Node GUI element having the badge of eight.

Figure 7:
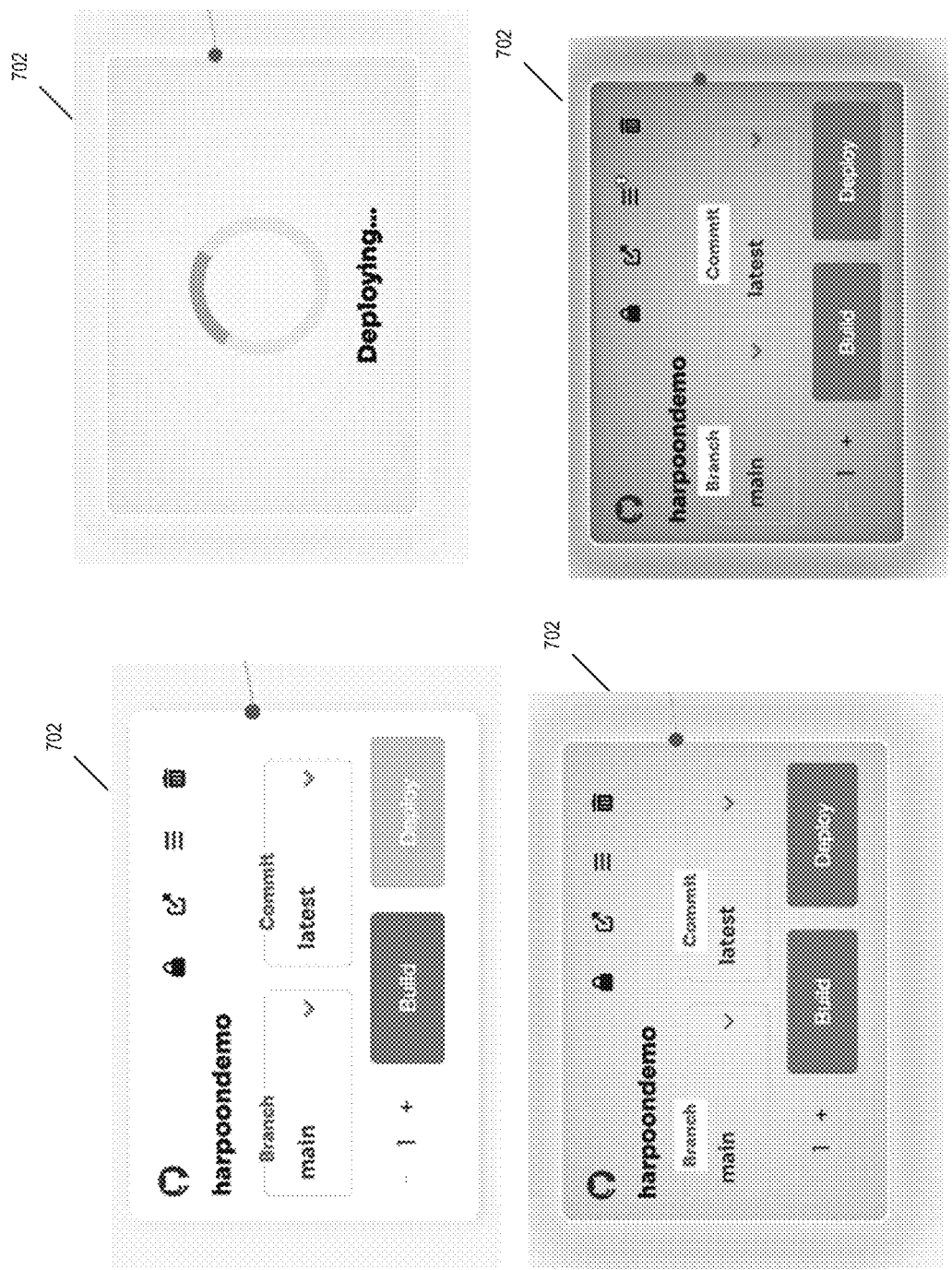

FIG. 7 shows user interface elements 702 associated with a Git element according to an example of the instant disclosure. Git elements may be attached to nodes. The git element may be a visual representation of a git repository that can be either a public or a private repository. A git repository may be built with a pre-existing Docker file or another type of text file or can be built using commands and an associated operating system to build the repository. In one example, there may be a GUI element that may allow a user to select a particular branch and commit on the branch to build and deploy.

Figure 8:
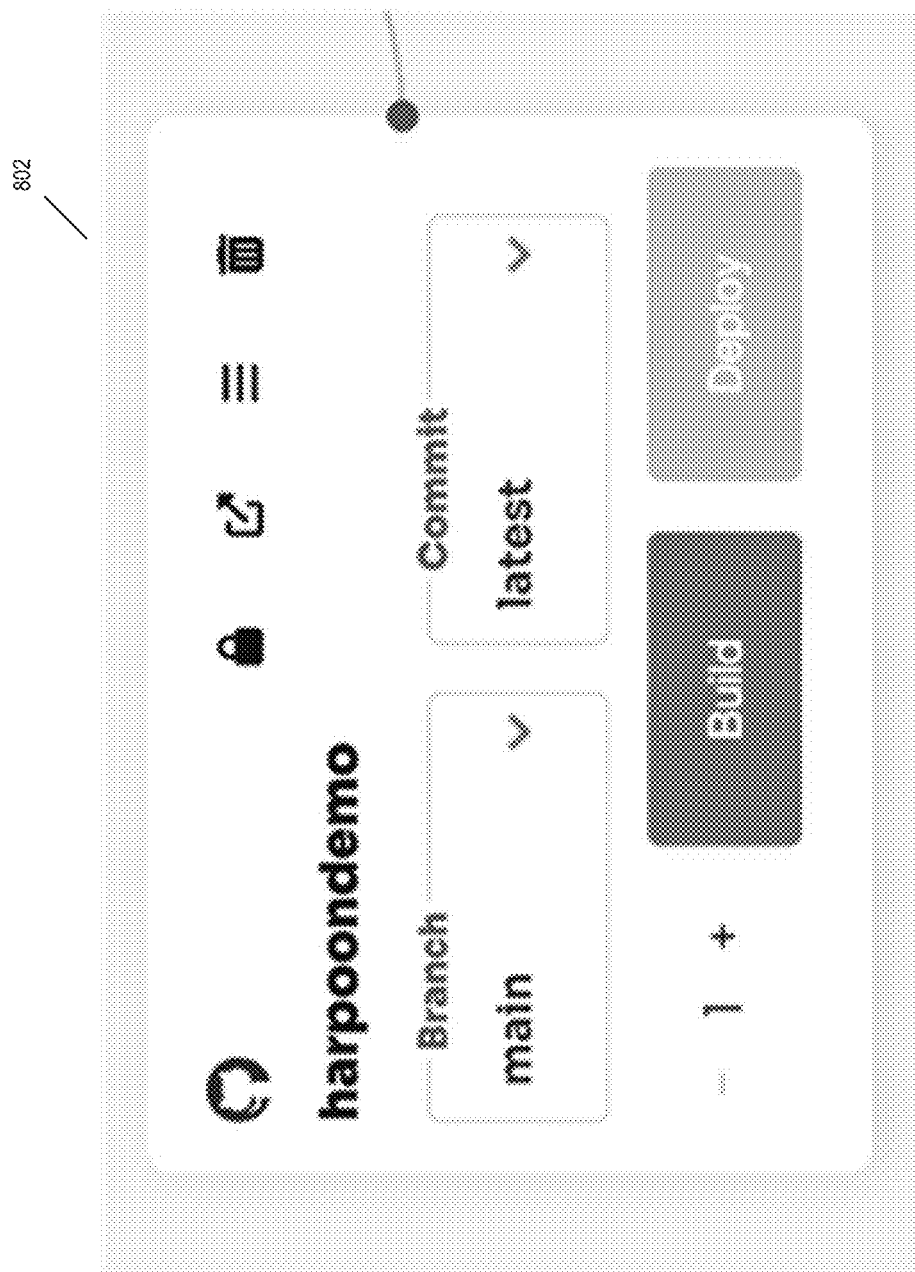

FIG. 8 shows a screenshot 802 of a Build graphical user interface that includes one or more user interface elements that allows a user to build a container image, e.g., a set of instructions and files to create a container such as installations, application code, and dependencies. In one example, the system 100 may either detect a Dockerfile in a repository and perform a build of the Dockerfile automatically or build the Dockerfile based on a technology stack used in the repository.

Figure 9:
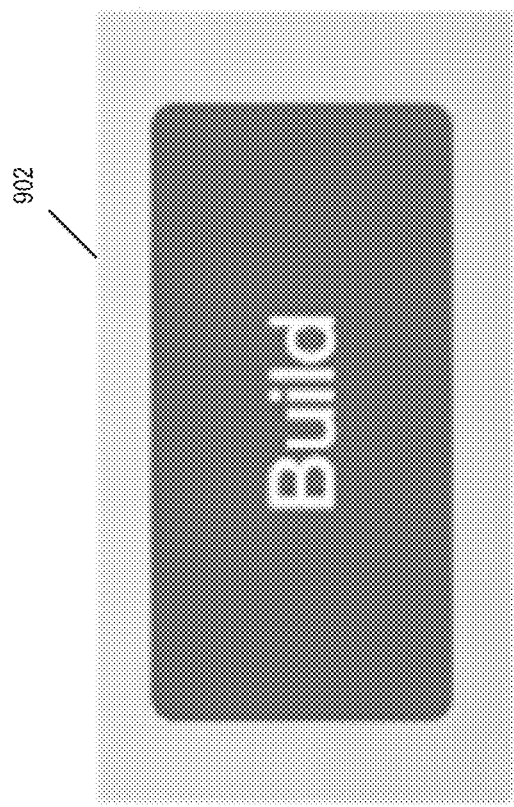

FIG. 9 shows a screenshot 902 of a Build graphical user interface element that allows a user to build and deploy.

Figure 10:
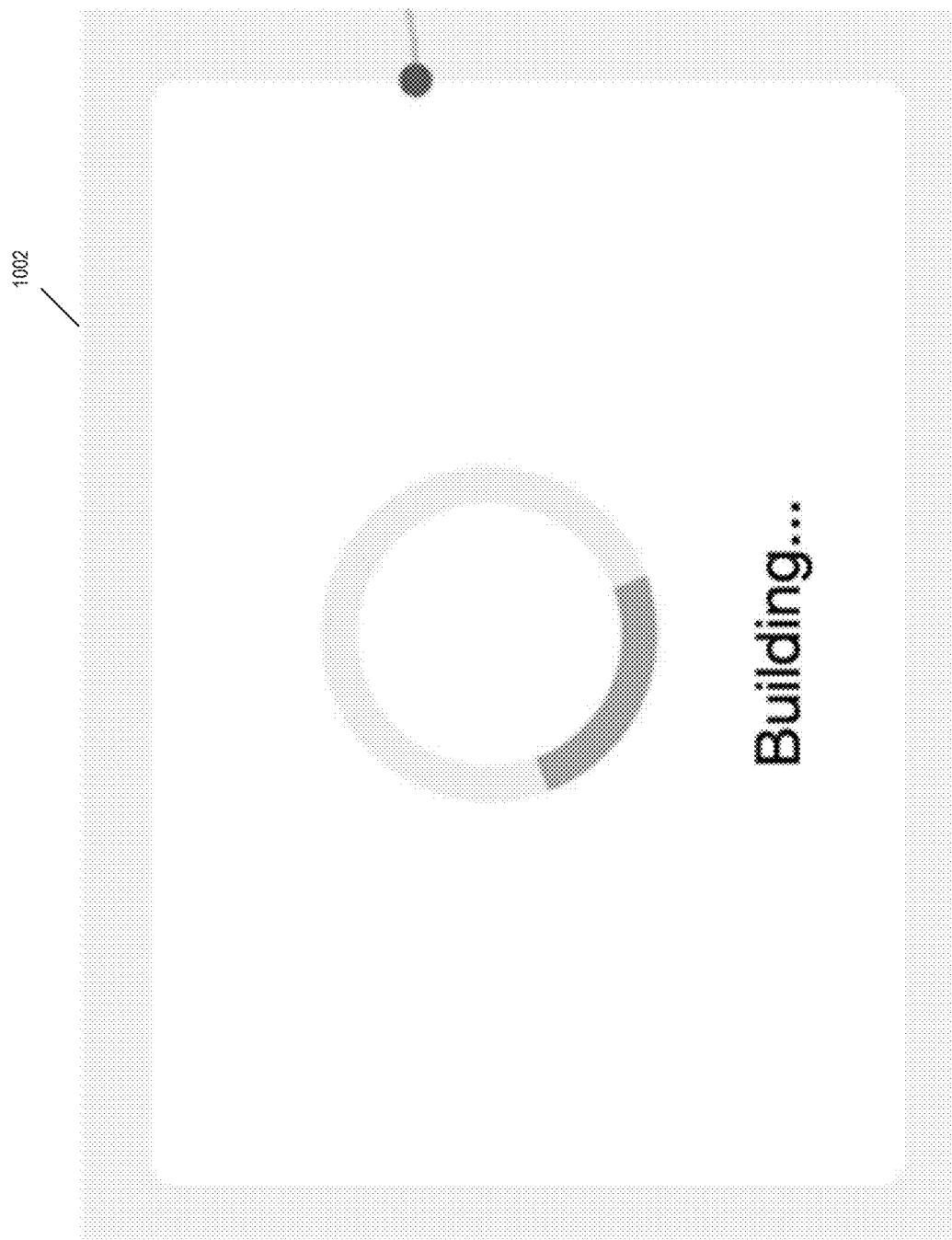

FIG. 10 shows a screenshot 1002 of a progress indicator that may be displayed when the user selects the Build button. As shown in FIG. 10, the progress indicator can animate and rotate while the image is being built.

Figure 11:
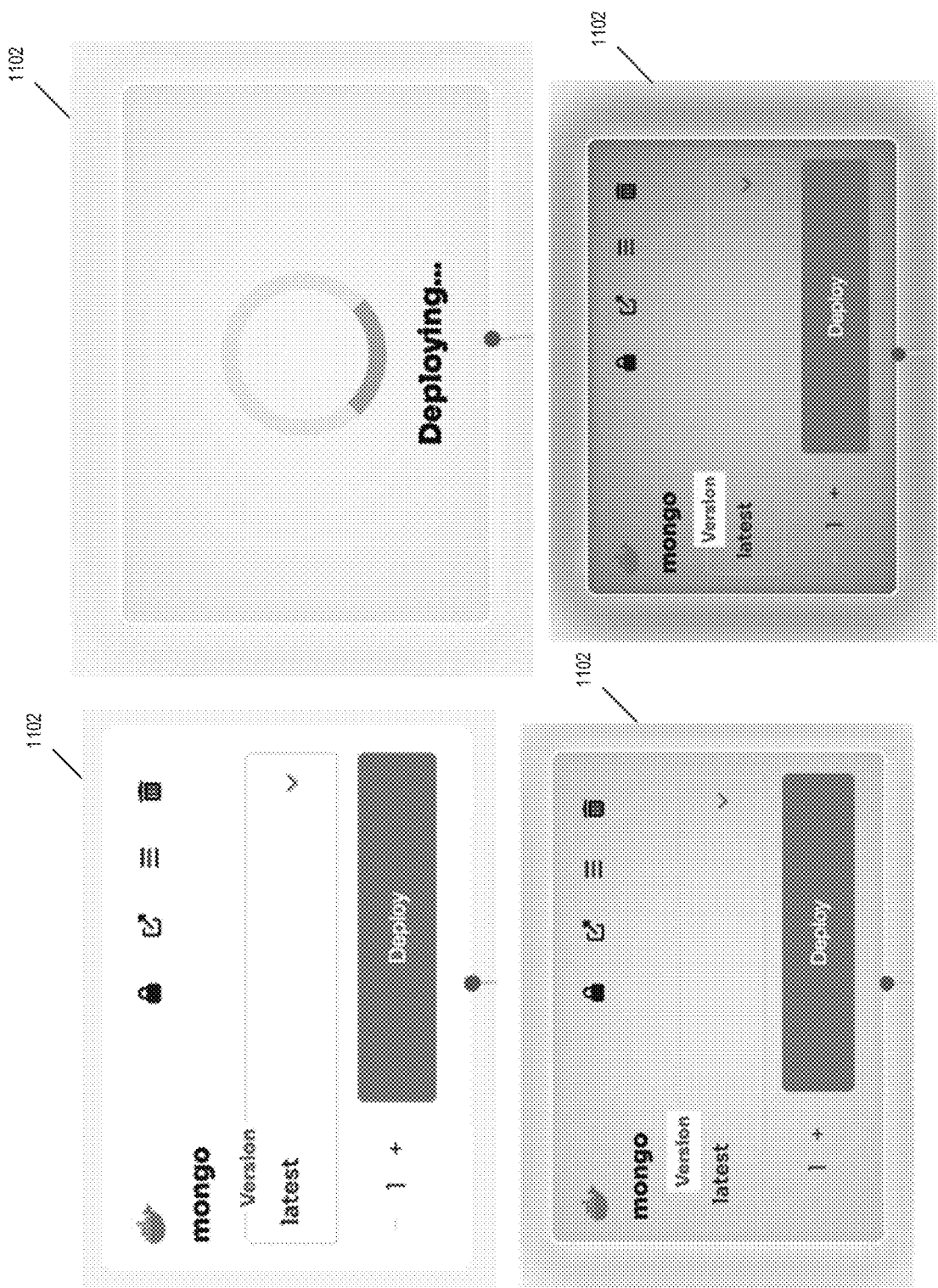

FIG. 11 shows user interface elements 1102 associated with a Container element according to an example of the instant disclosure. Container elements may be attached to nodes. The Container element is a visual representation of a container image that can be deployed to a cluster. When a user requests the deployment of a container using the client computing device 102, the request is sent to the server computing device 104. As shown in FIG. 11, the container element may be related to MongoDB or any other container image that is or could be created. The user can select a version, e.g., latest, and then select a deploy button. In addition, the user can select a number of replica sets by selecting a user interface to add and/or remove instances of a container image. As shown in FIG. 11, there is one replica set.

The client computing device 102 may send the image and configuration information to the server computing device 104 for creation of the container. The system may store kubeconfig that may be used to connect and interact with a cluster so that requests can be made directly to the cluster. The server computing device 104 may receive the information from the client computing device 102 and may dynamically generate a set of KUBERNETES manifests to allow for the deployment of the container to the running cluster. The manifests may vary based on the nature of the request from the client computing device 102 but a KUBERNETES deployment object may be created to instruct the cluster to deploy the container. As an example, a manifest may be a specification of the desired states of KUBERNETES objects including API requests and the manifest may be in a JavaScript Object Notation (JSON) format or a YAML format. The server computing device 104 may deploy the manifests to the cluster using an Application Programming Interface (API) and determine whether there is a successful or unsuccessful deployment of the container. The state and status of the deployment may be sent from the server computing device 104 to the client computing device 102 to show the user the state of the request.

A user can use the graphical interface to deploy a workload to a Kubernetes cluster. This interface allows a user to select an image for deployment and drag it on to a visual graph. This image can be obtained from Docker Hub, a private registry, or built from a GitHub or other repository.

Prior to deploying workloads, the cluster can be deployed to allow deployments of containers. This is done by pressing the "Cluster Start" button on the interface. This starts the following request-response flow:

TABLE ONE

| Example Request | Response |
| --- | --- |
| {<br>  "node_count": 1,<br>  "cloud_provider": "aws",<br>  "region": "us-west-2",<br>  "availabilityZones": [<br>    "us-west-2a",<br>    "us-west-2b",<br>    "us-west-2c",<br>    "us-west-2d"<br>  ],<br>  "ami": "ami-056c679fab9e48d8a"<br>} | "OK" |

This kicks off the cluster deployment flow within the system's Deployment Service. The actual request gets an instant response as the process is considered asynchronous and success will be communicated through websocket messages. The Deployment Service may take the information provided in the request to trigger a Terraform and Ansible workflow used to automatically deploy the cluster. The deployment service dynamically generates a variables file that is injected as environment variables into the runtime environment of the Terraform executable. Additionally, the deployment service auto-selects the correct Terraform codebase to deploy based on the parameters in the deployment request, primarily, the cloud provider field. Once completed, the deployment service sends a websocket message to the frontend display to update the interface and notify the user that the deployment is complete. An example of a generated deployment manifest is shown below:

```
apiVersion: apps/v1
kind: Deployment
metadata:
  annotations:
    deployment.kubernetes.io/revision: "4"
  creationTimestamp: "2023-01-13T16:14:47Z"
  generation: 4
  name: 63c18377ceefb40011dd602c
  namespace: harpoon-92122-12996
  resourceVersion: "13247"
  selfLink: /apis/apps/v1/namespaces/harpoon-92122-12996/deployments/63c18377ceefb40011dd602c
  uid: 2fed85cf-4411-47f7-a64a-8ae782ef6f29
spec:
  progressDeadlineSeconds: 600
  replicas: 1
  revisionHistoryLimit: 10
  selector:
    matchLabels:
      harpoonDeploymentID: 63c18377ceefb40011dd602c
      userID: 63acc8ca3e6a3c00125c302e
  strategy:
    rollingUpdate:
      maxSurge: 25%
      maxUnavailable: 25%
    type: RollingUpdate
  template:
    metadata:
      creationTimestamp: null
      labels:
              harpoonDeploymentID: 63c18377ceefb40011dd602c
              userID: 63acc8ca3e6a3c00125c302e
      name: 63c18377ceefb40011dd602c
    spec:
      containers:
        - env:
            - name: testtest
              valueFrom:
                secretKeyRef:
                  key: testtest
                  name: harpoon-secret-78923-97237-19135
            - name: test
              valueFrom:
                configMapKeyRef:
                  key: test
                  name: harpoon-configmap-56480-50053-55013
          image: nginx
          imagePullPolicy: Always
          name: container-58a3ed6f2965252c6ac4957d95f7a3bdfca47101
```

```
            resources: { }
            terminationMessagePath: /dev/termination-log
            terminationMessagePolicy: File
            volumeMounts:
            -           mountPath: /tmp/test
                        name: vol-0
    dnsPolicy: ClusterFirst
    restartPolicy: Always
    schedulerName: default-scheduler
    securityContext: { }
    terminationGracePeriodSeconds: 30
    volumes:
    -           name: vol-0
                persistentVolumeClaim:
                            claimName: harpoon-volume-90973-35141-52203
status:
    availableReplicas: 1
    conditions:
    - lastTransitionTime: "2023-01-13T16:45:37Z"
      lastUpdateTime: "2023-01-13T16:45:37Z"
      message: Deployment has minimum availability.
      reason: MinimumReplicasAvailable
      status: "True"
      type: Available
    - lastTransitionTime: "2023-01-13T16:14:47Z"
      lastUpdateTime: "2023-01-13T16:45:37Z"
      message: ReplicaSet "63c18377ceefb40011dd602c-868fd877c4" has successfully progressed.
      reason: NewReplicaSetAvailable
      status: "True"
      type: Progressing
    observedGeneration: 4
    readyReplicas: 1
    replicas: 1
updatedReplicas: 1
```

For services that are meant to be exposed with an "Ingress Route", the following YAML is generated and applied to the cluster:

```
                        apiVersion: v1
kind: Service
metadata:
    creationTimestamp: "2023-01-13T17:28:33Z"
    finalizers:
    -           service.kubernetes.io/load-balancer-cleanup
    name: srv-63c18377ceefb40011dd602c-external
    namespace: harpoon-92122-12996
    resourceVersion: "24451"
    selfLink:   /api/v1/namespaces/harpoon-92122-12996/services/srv-63c18377ceefb40011dd602c-external
    uid: 83f54a72-dcd8-4923-b254-a4a35f8fa9c7
spec:
    clusterIP: 10.43.112.92
    externalTrafficPolicy: Cluster
    ports:
    -           name: 80-srv
                nodePort: 32138
                port: 80
                protocol: TCP
                targetPort: 80
    selector:
                harpoonDeploymentID: 63c18377ceefb40011dd602c
                userID: 63acc8ca3e6a3c00125c302e
    sessionAffinity: None
    type: LoadBalancer
status:
    loadBalancer:
                ingress:
hostname: a83f54a72dcd84923b254a4a35f8fa9c-216518209.us-west-2.elb.amazonaws.com
```

Once the user drags and drops a container for deployment, a call is made to the Deployment Service within the system 100 to orchestrate the deployment. The frontend interface automatically generates a few key pieces of information required for deployment including container image name and version, source registry, destination cluster, and number of instances. This information is taken in by the Deployment Service and used to generate a set of Kubernetes manifests that are used to actually deploy the containers to the cluster. These manifests define both Deployment and Service Kubernetes resources. The Deployment Service retrieves the Kubernetes cluster information from the database and establishes a connection to deploy the manifests that were generated. Once this connection is established, the system 100 deploys the autogenerated manifests and monitors for results of the deployment. Any successes or errors are reported to the frontend for visual representation to the user. These messages are sent over websockets to allow for real-time updates to the frontend.

Users are also able to deploy additional resource types with a similar workflow. The graphical interface allows for the deployment of volumes, configuration maps, secrets, and other core Kubernetes resources. The same process of automatic manifest generation and automatic connection to Kubernetes is used to deploy these resource types. Additionally, for publicly accessible services, the system 100 can query DNS servers directly to allow for a link to be presented more quickly to the user and ensure that public services are indeed ready as the Kubernetes API can falsely report they are ready. Resource-specific configuration fields are handled by the frontend interface and passed to the backend services within the system 100 to ensure that the deployed resources are properly configured.

For example, a user deploying nginx, a popular web server and proxy, can search for the phrase "nginx" within the user interface. The user interface may query any configured private registries and the public Docker Hub registry to search for images. The request issued for that query is structured as follows:

TABLE TWO

| Request | Response |
| --- | --- |
| A GET request is made to https://app.harpooncorp.com/rest/api/search?query=nginx The query parameter has the query entered by the user. | [ { "star_count": 17934, "is_official": true, "name": "nginx", "is_automated": false, "description": "Official build of Nginx." }, { "star_count": 150, "is_official": false, "name": "bitnami/nginx", "is_automated": true, "description": "Bitnami nginx Docker Image" } ] |

Once the services have been queried, users may be presented with a set of choices to pick from. The user then selects which exact container image they would like deployed and drag it over to the workspace on the user interface. The image that was dragged over to the workspace may automatically be assigned a node and a line may be made between a node and the newly dragged container image. The user can then hit the "deploy" button which triggers a request from the user interface to the Deployment Service. This request-response flow is as follows:

TABLE THREE

| Request | Response |
| --- | --- |
| { "namespace": "harpoon-92122-12996", | "63c18377ceefb40011dd602c" |

TABLE THREE-continued

| Request | Response |
| --- | --- |
| "imageName": "nginx", "imageTag": "latest", "tcpExposePorts": [ ], "internalTcpExposePorts": [ ], "harpoonHarborProjectId": "non-harbor", "replicas": 1, "volumeMounts": [ ], "configMaps": [ ], "secrets": [ ], "deploymentCommands": "", "deploymentArguments": "" } | |

The request itself responds synchronously with an identifier that can be used by the frontend to identify the requested deployment for later modifications to the Kubernetes Deployment. This information is taken in by the Deployment Service and can be used to generate a set of Kubernetes manifests that are used to actually deploy the containers to the cluster. For this example, nginx image information that was sent to the Deployment Service may lead to the creation of a Kubernetes Deployment resource that will pull the specified image down to the Kubernetes cluster. The deployment service retrieves the Kubernetes cluster information from the database and establishes a connection to deploy the manifests that were generated. Once this connection is established, the system 100 deploys the autogenerated manifests and monitors for results of the deployment. Any successes or errors are reported to the frontend for visual representation to the user. These messages are sent over websockets to allow for real-time updates to the frontend. The identifier provided earlier is used to map the websockets received to the appropriate deployment on the user interface.

There are a few other resources that can be deployed with the system 100. Their request flows are the same as deployments, but they have different requests as shown in the following table.

TABLE FOUR

| Resource | Endpoint | Request |
|---|---|---|
| Volume | https://app.harpooncorp.com/deployment/cluster/volumes/create | { "namespace": "harpoon-92122-12996", "volumeId": "harpoon-volume-90973-35141-52203", "volumeSize": "10", "volumeUnit": "Gi" } |
| Config Map | https://app.harpooncorp.com/deployment/cluster/configmap/create | { "namespace": "harpoon-92122-12996", "name": "harpoon-configmap-56480-50053-55013", "data": { "test": "test" } } |
| Secrets | https://app.harpooncorp.com/deployment/secrets/create | { "namespace": "harpoon-92122-12996", "name": "harpoon-secret-78923-97237-19135", "data": { "testtest": "dGVzdA==" } } |

All of the requests above are expected to return 200 upon success. Once associated with a container element on the user interface, an updated container deployment request is made. A container deployment request that is meant to update an existing container includes the identifier shown below as "internalHarpoonId". The following shows an example request:

```
{
    "namespace": "harpoon-92122-12996",
    "imageName": "nginx",
    "imageTag": "latest",
    "internalHarpoonId": "63c18377ceefb40011dd602c",
    "tcpExposePorts": [ ],
    "internalTcpExposePorts": [ ],
    "volumeMounts": [
        {
            "volumeId": "harpoon-volume-90973-35141-52203",
            "mountPath": "/tmp/test"
        }
    ],
    "configMaps": [
        {
            "configMapId": "harpoon-configmap-56480-50053-55013",
            "envMappings": [
```

-continued

```
            {
                "envVarName": "test",
                "configMapKey": "test"
            }
        ]
    }
    ],
    "secrets": [
        {
            "secretId": "harpoon-secret-78923-97237-19135",
            "envMappings": [
                {
                    "envVarName": "testtest",
                    "secretKey": "testtest"
                }
            ]
        }
    ],
    "deploymentCommands": "",
    "deploymentArguments": ""
}
```

On initial page load, the frontend makes a "cluster status call" which is described in the following table.

TABLE FIVE

| Example Request | Response |
| --- | --- |
| {<br>  "namespace": "harpoon-92122-12996",<br>  "cloud_provider": "aws",<br>  "region": "us-west-2"<br>} | [<br>  {<br>    "deploymentSpec": {<br>      "progressDeadlineSeconds": 600,<br>      "replicas": 1,<br>      "revisionHistoryLimit": 10,<br>      "selector": {<br>        "matchLabels": {<br>          "harpoonDeploymentID": "63c18377ceefb40011dd602c",<br>          "userID": "63acc8ca3e6a3c00125c302e"<br>        }<br>      },<br>      "strategy": {<br>        "rollingUpdate": {<br>          "maxSurge": "25%",<br>          "maxUnavailable": "25%"<br>        },<br>        "type": "RollingUpdate"<br>      },<br>      "template": {<br>        "metadata": {<br>          "creationTimestamp": null,<br>          "labels": {<br>            "harpoonDeploymentID": "63c18377ceefb40011dd602c",<br>            "userID": "63acc8ca3e6a3c00125c302e"<br>          },<br>          "name": "63c18377ceefb40011dd602c"<br>        },<br>        "spec": {<br>          "containers": [<br>            {<br>              "image": "nginx",<br>              "imagePullPolicy": "Always",<br>              "name": "container-58a3ed6f2965252c6ac4957d95f7a3bdfca47101",<br>              "resources": { },<br>              "terminationMessagePath": "/dev/termination-log",<br>              "terminationMessagePolicy": "File"<br>            }<br>          ],<br>          "dnsPolicy": "ClusterFirst",<br>          "restartPolicy": "Always",<br>          "schedulerName": "default-scheduler",<br>          "securityContext": { },<br>          "terminationGracePeriodSeconds": 30<br>        }<br>      }<br>    },<br>    "deploymentStatus": {<br>      "availableReplicas": 1,<br>      "conditions": [<br>        {<br>          "lastTransitionTime": "2023-01-13T16:14:53.000Z",<br>          "lastUpdateTime": "2023-01-13T16:14:53.000Z",<br>          "message": "Deployment has minimum availability.",<br>          "reason": "MinimumReplicasAvailable",<br>          "status": "True",<br>          "type": "Available"<br>        },<br>        {<br>          "lastTransitionTime": "2023-01-13T16:14:47.000Z",<br>          "lastUpdateTime": "2023-01-13T16:14:53.000Z",<br>          "message": "ReplicaSet \"63c18377ceefb40011dd602c-6d5d9665d6\" has successfully progressed.",<br>          "reason": "NewReplicaSetAvailable",<br>          "status": "True",<br>          "type": "Progressing"<br>        }<br>      ],<br>      "observedGeneration": 1,<br>      "readyReplicas": 1,<br>      "replicas": 1,<br>      "updatedReplicas": 1<br>    }<br>  }<br>] |

This call returns the state of the cluster as a result of the actions made against that cluster within the system or outside of the system 100. This information is pulled from the Kubernetes API and embedded within a custom structure for consumption by the user interface. This state call returns information about the deployments themselves and the services that are used to access them over the internet along with the supporting components that can be created by the system 100, which include but are not limited to, Volumes, Secrets, Ingress, and Configuration Maps.

Figure 12:
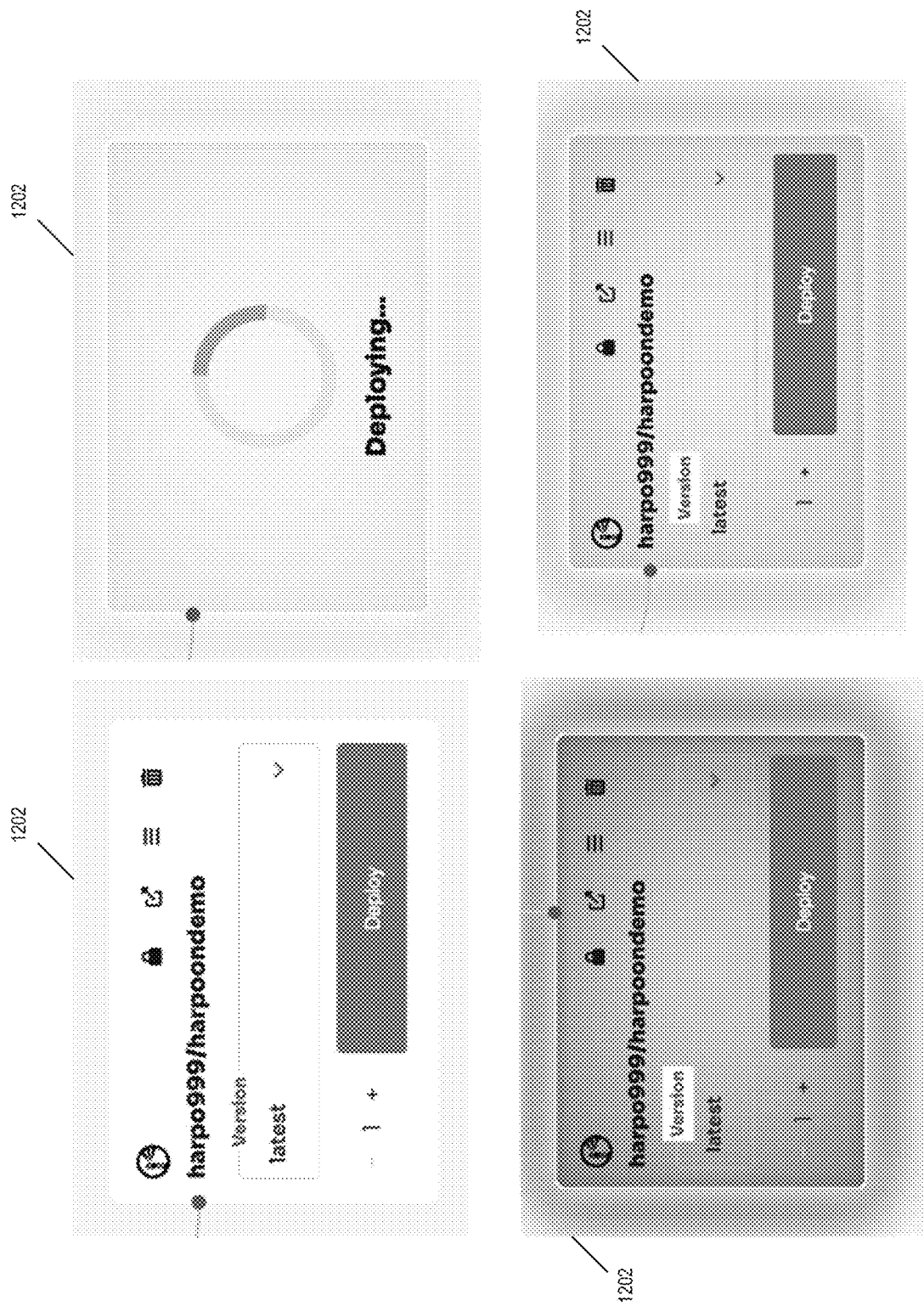

FIG. 12 shows user interface elements 1202 associated with a Container element which is hosted in a private container registry, such as Harbor, according to an example of the instant disclosure. Container elements may be attached to nodes. The Container element is a visual representation of a container image that can be deployed to a cluster. When a user requests the deployment of a container using the client computing device 102, the request is sent to the server computing device 104. As shown in FIG. 12, the container element may be a Harbor element. The user can select a version, e.g., latest, and then select a deploy button. In addition, the user can select a number of nodes by selecting a user interface to add and/or remove nodes. As shown in FIG. 12, there is one node.

Figure 13:
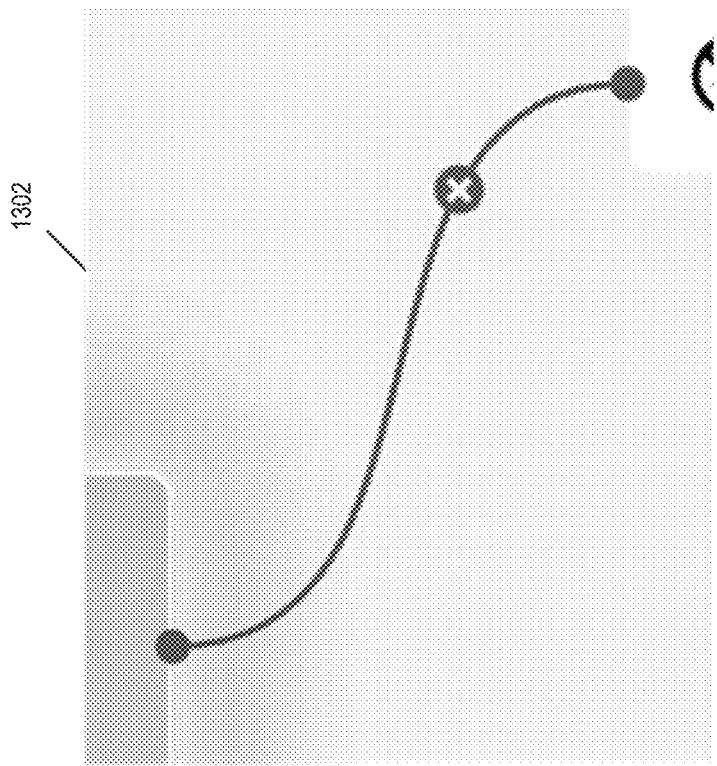
Figure 13:
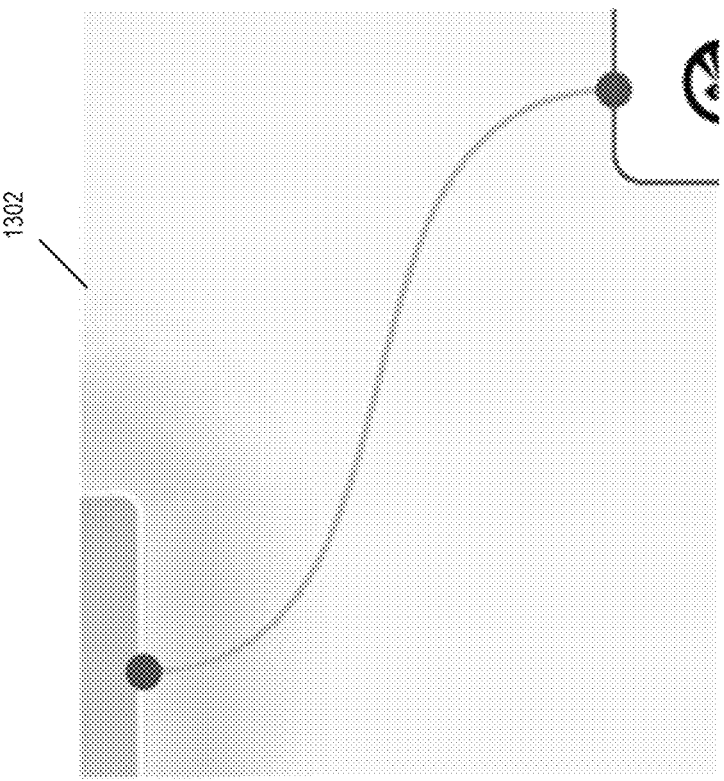

FIG. 13 shows user interface elements 1302 associated with a link element according to an example of the instant disclosure. The link element is a visual representation between elements on the graphical user interface. Links may be attached by dragging from one element to another element until the second element is selected. In addition, a link may be removed or deleted by selecting the "X" GUI element. A link represents a relationship between elements and how they are deployed in the KUBERNETES cluster.

Figure 14:
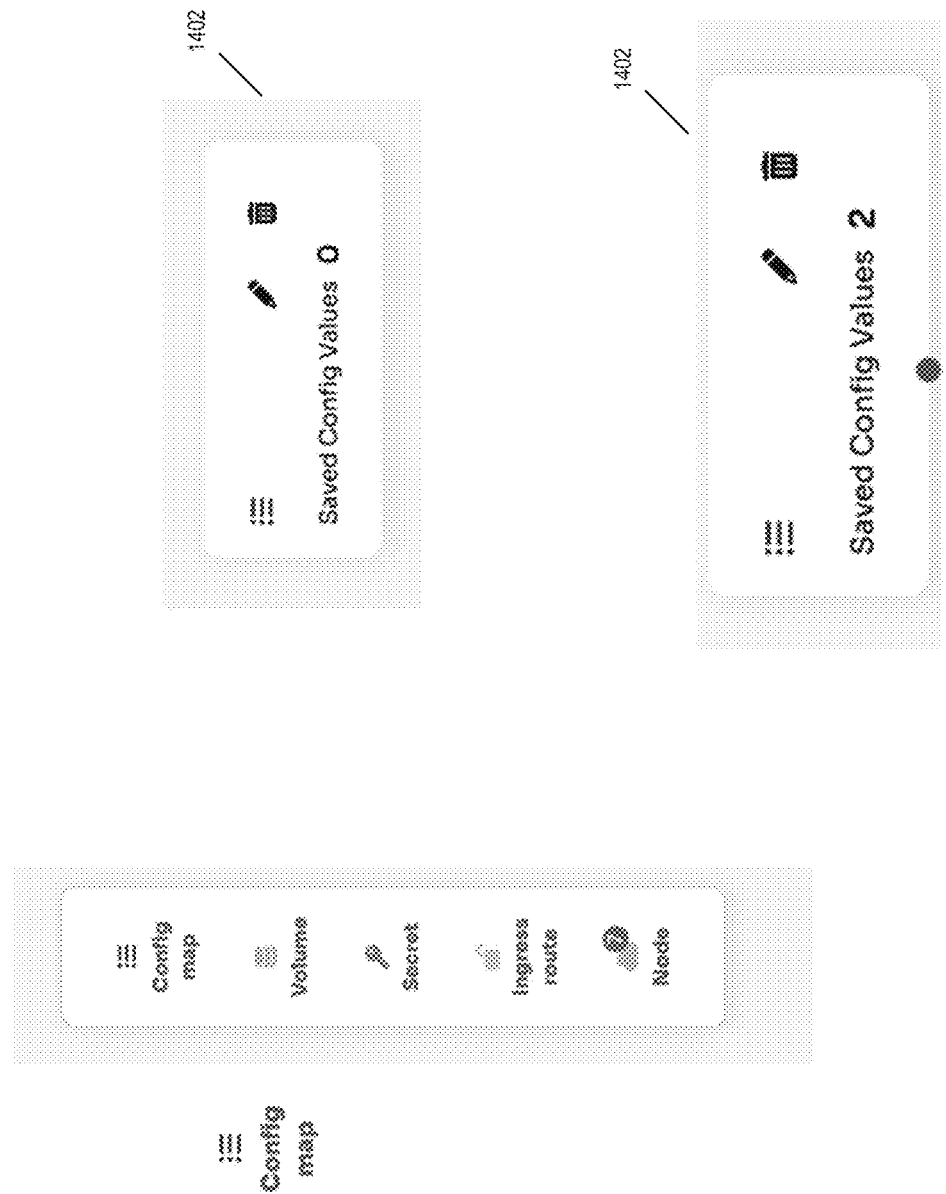
Figure 15:
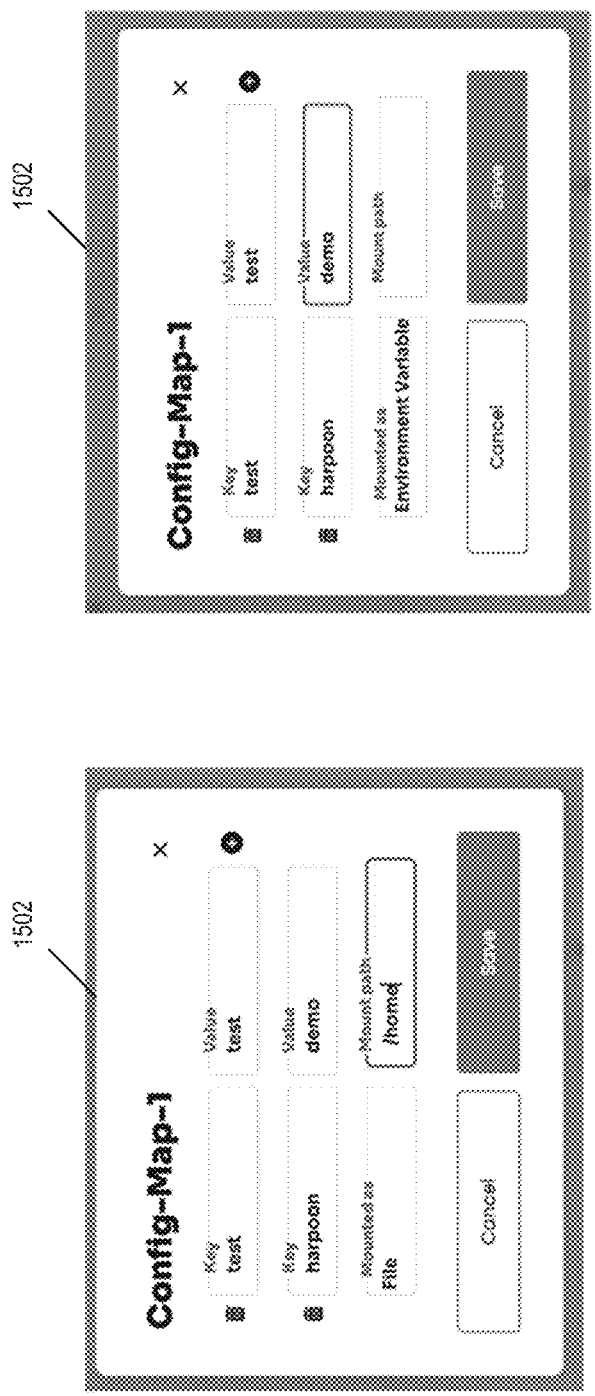

FIGS. 14 and 15 show user interface elements 1402 and 1502 associated with a ConfigMap element according to an example of the instant disclosure. A ConfigMap element is a visual representation of a KUBERNETES ConfigMap. A ConfigMap is a key/value pair that can store a configuration for other objects to use. ConfigMap elements may be attached to git or container elements. When a ConfigMap element is attached to a git or container element, the ConfigMap element may modify a deployment descriptor for the relevant KUBERNETES pod that may be deployed in the KUBERNETES cluster and may execute a command to update the configuration for the deployment using the API. The client computing device 102 may send a request and make a call to the server computing device 104 to generate manifest information and push the manifest information dynamically for the user. The server computing device 104 may modify the associated container deployment to expose the ConfigMap to the running container deployment.

Figure 16:
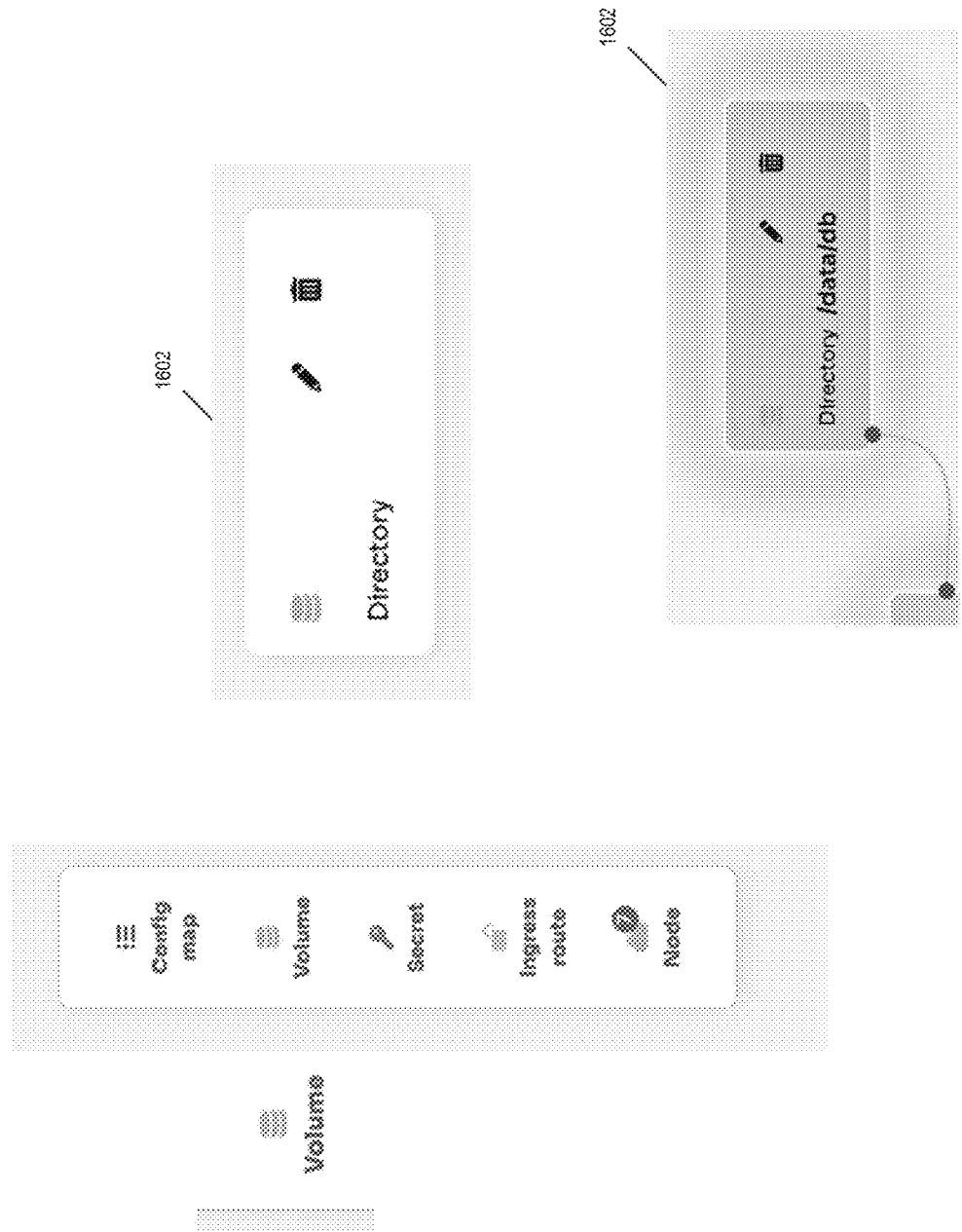
Figure 17:
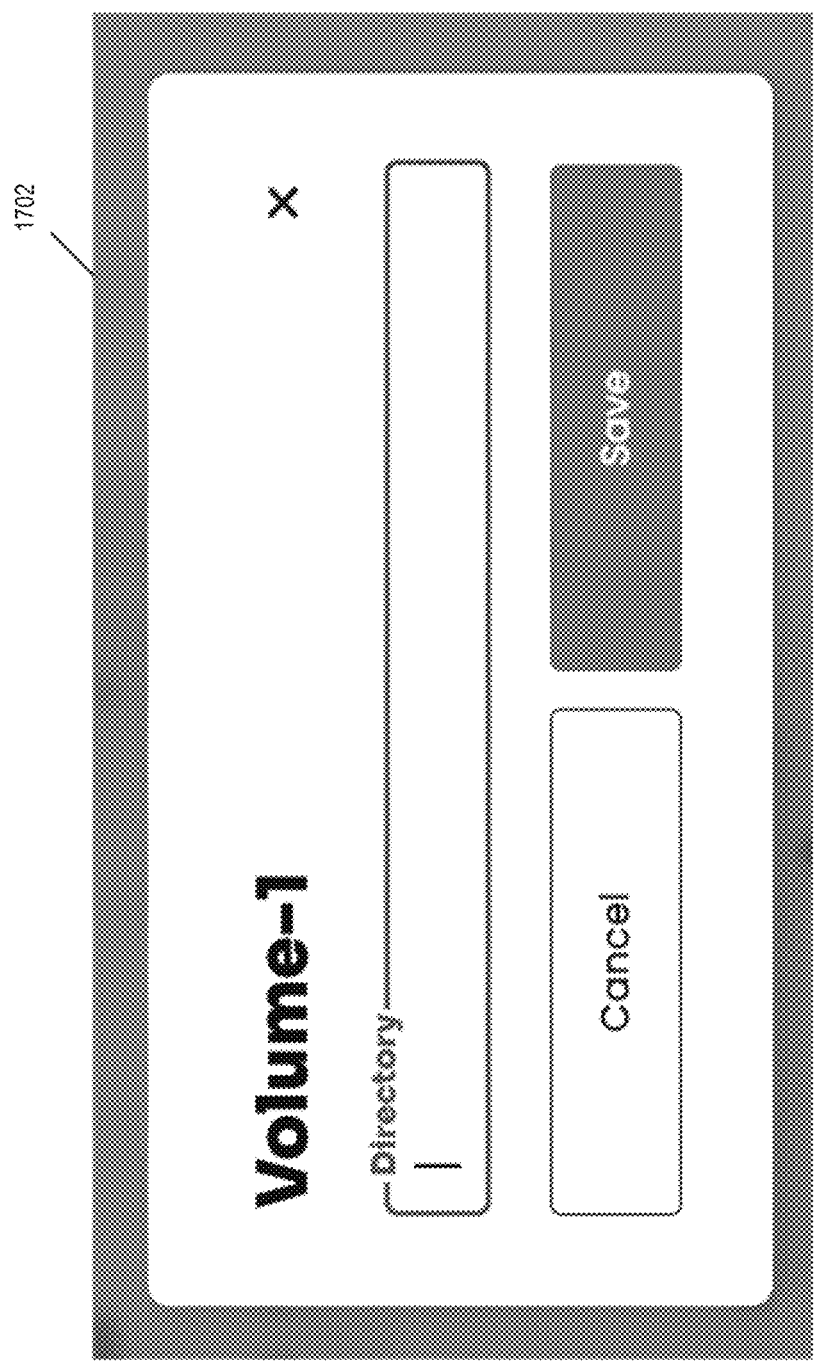

FIGS. 16 and 17 show user interface elements 1602 and 1702 associated with a Volume element according to an example of the instant disclosure. A Volume element is a visual representation of a KUBERNETES Persistent Volume Claim (PVC) for a particular git or container element. A PVC is a request for storage by a user. A user can provide input for a volume directory location inside a pod where the data may be replicated to a distributed volume in the cloud or on-premise. Volume elements may be attached to git or container elements.

When a volume element is attached to a git or container element, the volume element can modify the deployment descriptor for the relevant KUBERNETES pod that may be deployed in the cluster and may execute a command to update the configuration for the deployment using the API. The PVC that is deployed can be dynamically linked to the distributed volume in the cloud. The client computing device 102 may send a request or call to the server computing device 104 and the server computing device 104 may generate a manifest and push the manifest to the pod dynamically on behalf of the user. The server computing device 104 may modify the associated container deployment to expose the volume to the running container deployment.

Figure 18:
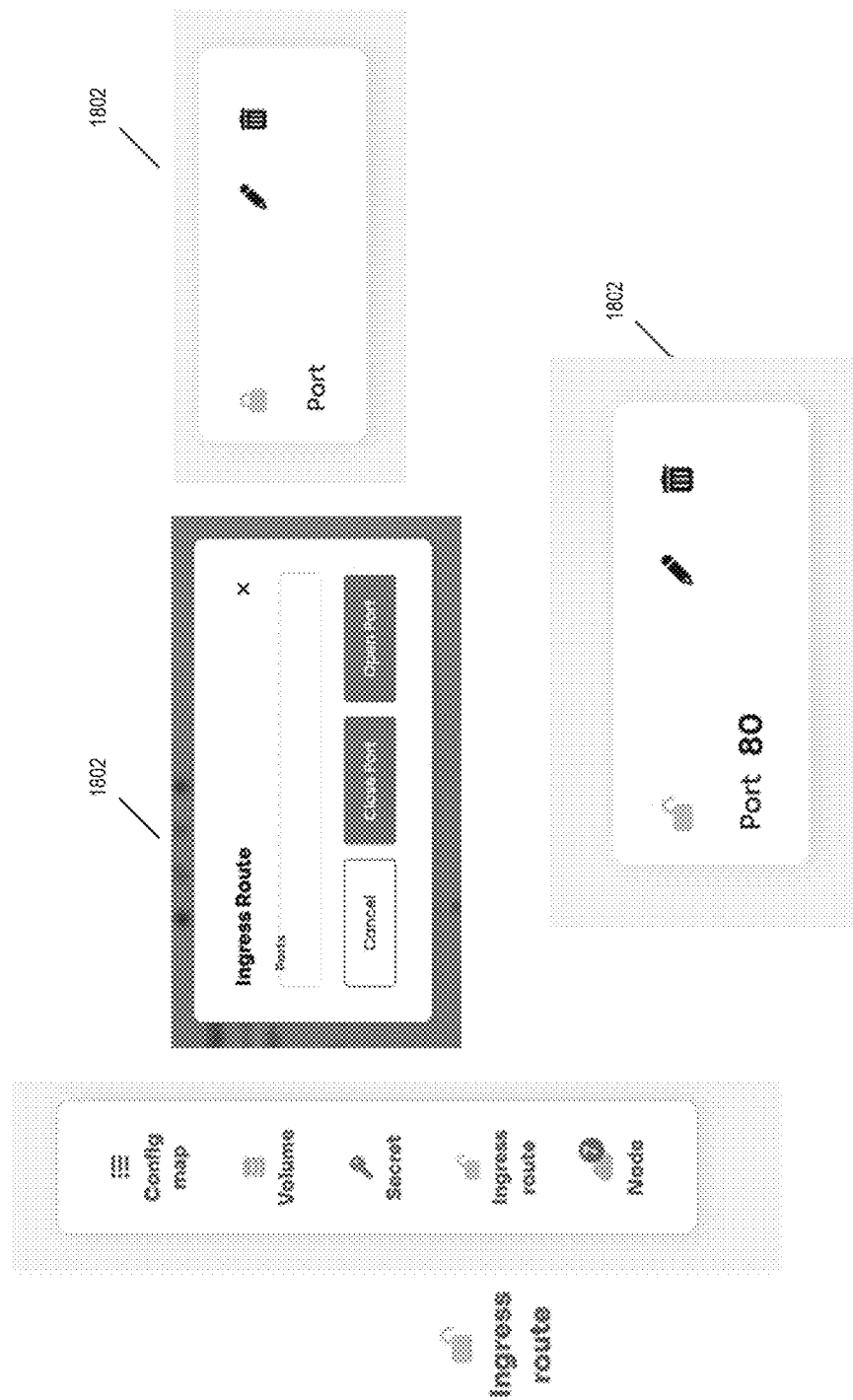

FIG. 18 shows user interface elements 1802 associated with an ingress route element according to an example of the instant disclosure. An ingress route element is a visual representation of a KUBERNETES Ingress Route for a deployed git or container element. An ingress route may expose Hypertext Transfer Protocol (HTTP) and Hypertext Transfer Protocol Secure (HTTPS) routes from outside the cluster to services and/or applications within the cluster. Users can provide a port number to open a port for a pod, e.g., 80. In addition, the user can select a lock user interface element on an ingress route element to open a lock and open the pod to receive network traffic. Ingress route elements may be attached to git or container elements.

When an ingress element is attached to a container element, the container element can modify the deployment descriptor for a pod that is deployed in the cluster and may execute a command to update the configuration for the deployment using the API. Based on the cloud computing service and/or the cloud computing provider, the system may generate manifest information to configure the ingress at the KUBERNETES level. For some deployments, the server computing device 104 may deploy a loadbalancer for the cluster. The loadbalancer may be configured to interact with a Service Mesh within the cluster to allow for automated configuration of ingress into the cluster. The server computing device 104 may monitor the route internally and externally to inform the user that the route is ready for use. The server computing device 104 may monitor DNS monitoring servers to determine when names propagate and are ready for use.

Figure 19:
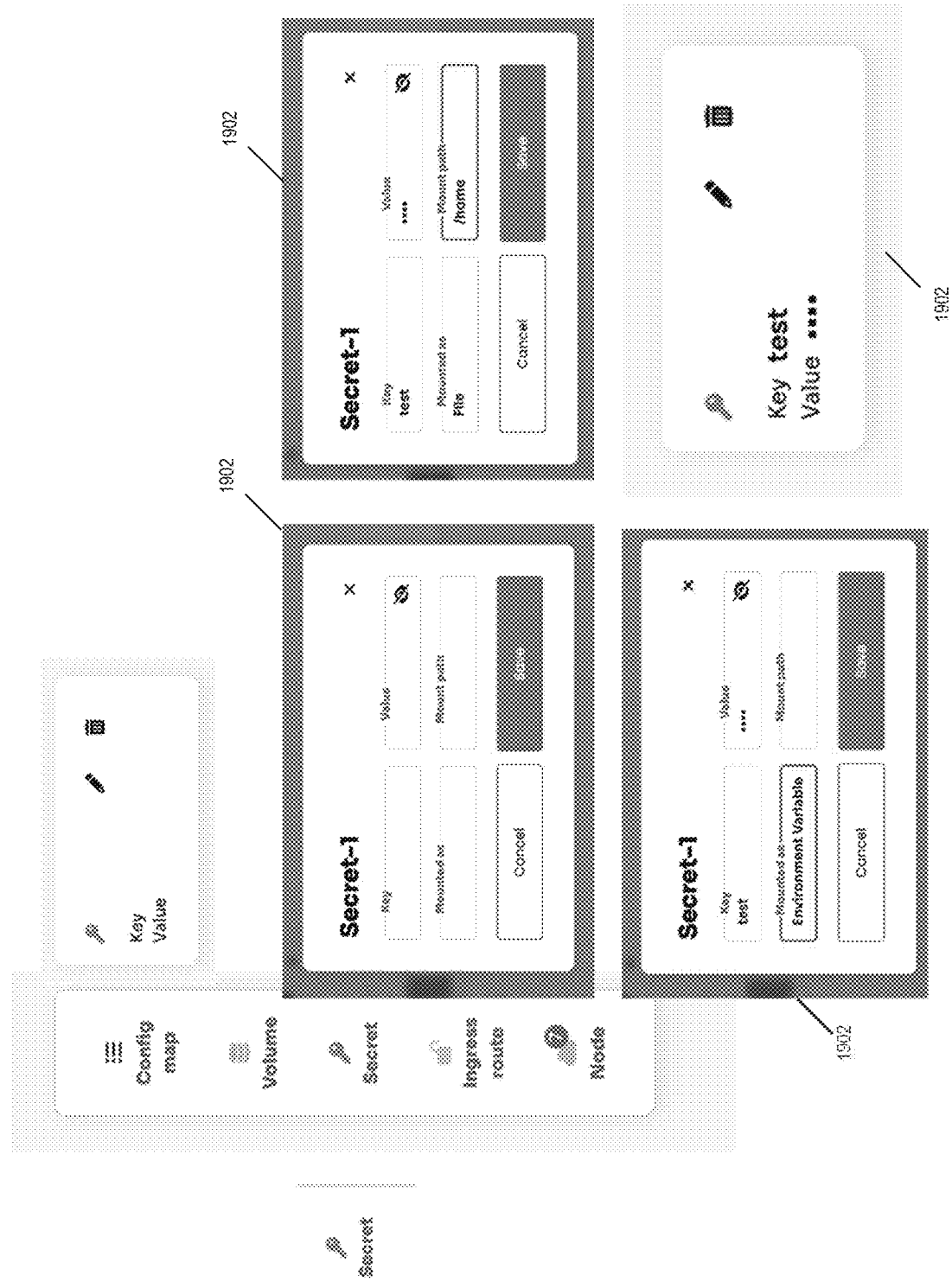

FIG. 19 shows a user interface element 1902 associated with a secret element according to an example of the instant disclosure. The secret element is a visual representation of KUBERNETES secrets storage for a particular git element or container element.

Secret elements may be attached to git elements or container elements. The secret element may receive a key/value pair similar to a ConfigMap, but also may provide security/encryption using KUBERNETES secrets storage capabilities (or other secrets management capabilities). As an example, a secret may be an object that may have sensitive data such as a password, a token, or a key, among other types of data. When the secret element is attached to a git element or a container element, this may allow the pod to use the key associated with the secret as a reference to the value of the secret. This may obfuscate the true value of the secret in associated source code or variables in use by the pod and may allow for dynamically modifying the secret value without updating software executed by the pod. The client computing device 102 may send a request or a call to the server computing device 104 that may generate manifest information and push the manifest information dynamically on behalf of the user. The server computing device 104 also may modify associated container deployment to expose the secret to the running container deployment.

FIG. 20 shows a screenshot 2002 of a log element according to an example of the instant disclosure. The log element may be a visual representation of logs output by the deployed pods that may allow users to view what is occurring inside the Kubernetes Pod. When a user selects a log button on a container element or a git element that is deployed, a request may be sent to the server computing device 104 to obtain log information. The server computing device 104 may send a request using the API to return log information for a specified pod identifier. As an example, the server computing device 104 may utilize a microservice such as a deployment microservice to obtain the log information. The deployment microservice may receive the response and send the log information to the client computing device 102 for display to the user. The server computing device 104 may connect directly to the API for the user cluster to obtain log information for the user deployments.

Figure 21:
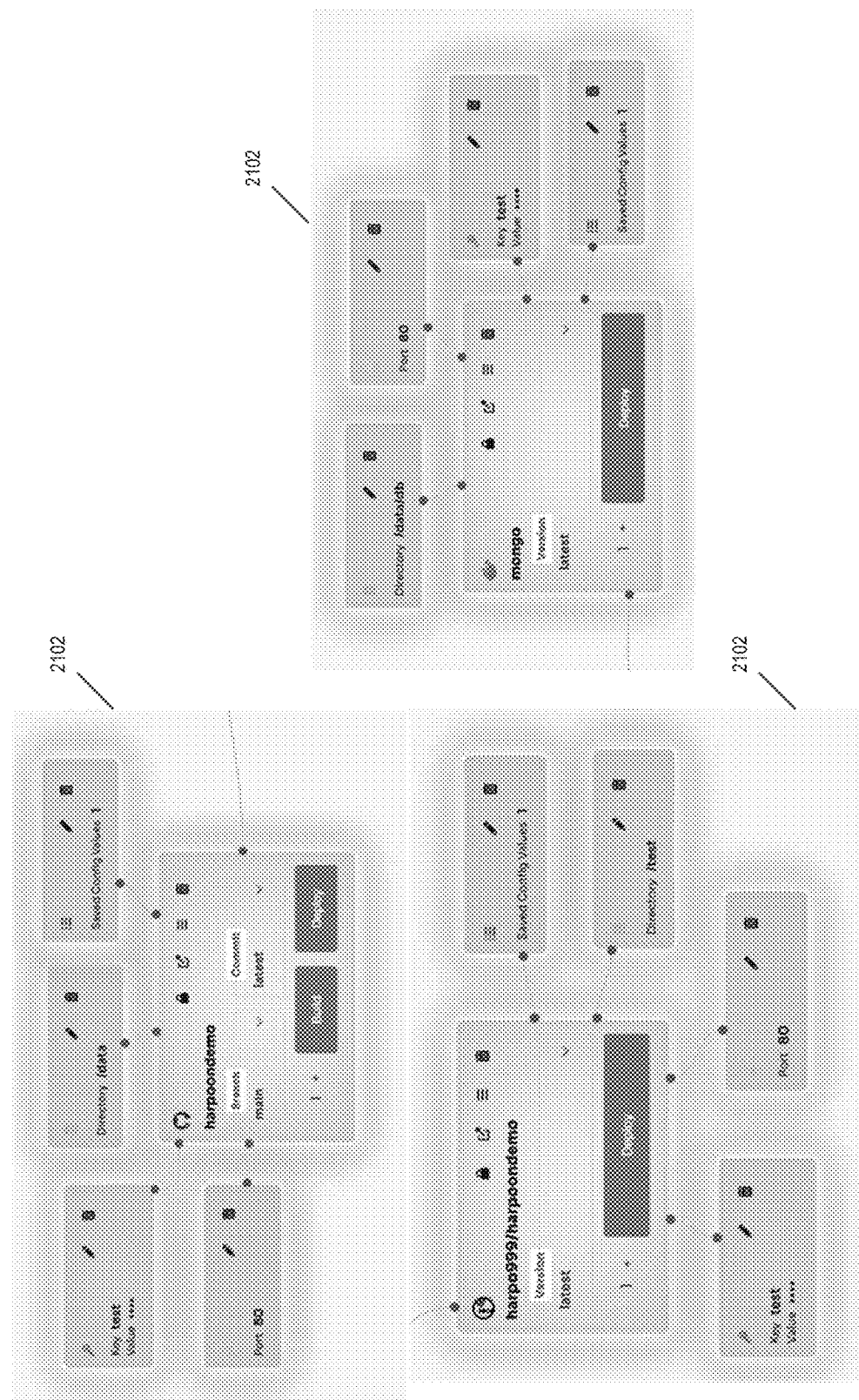
Figure 22:
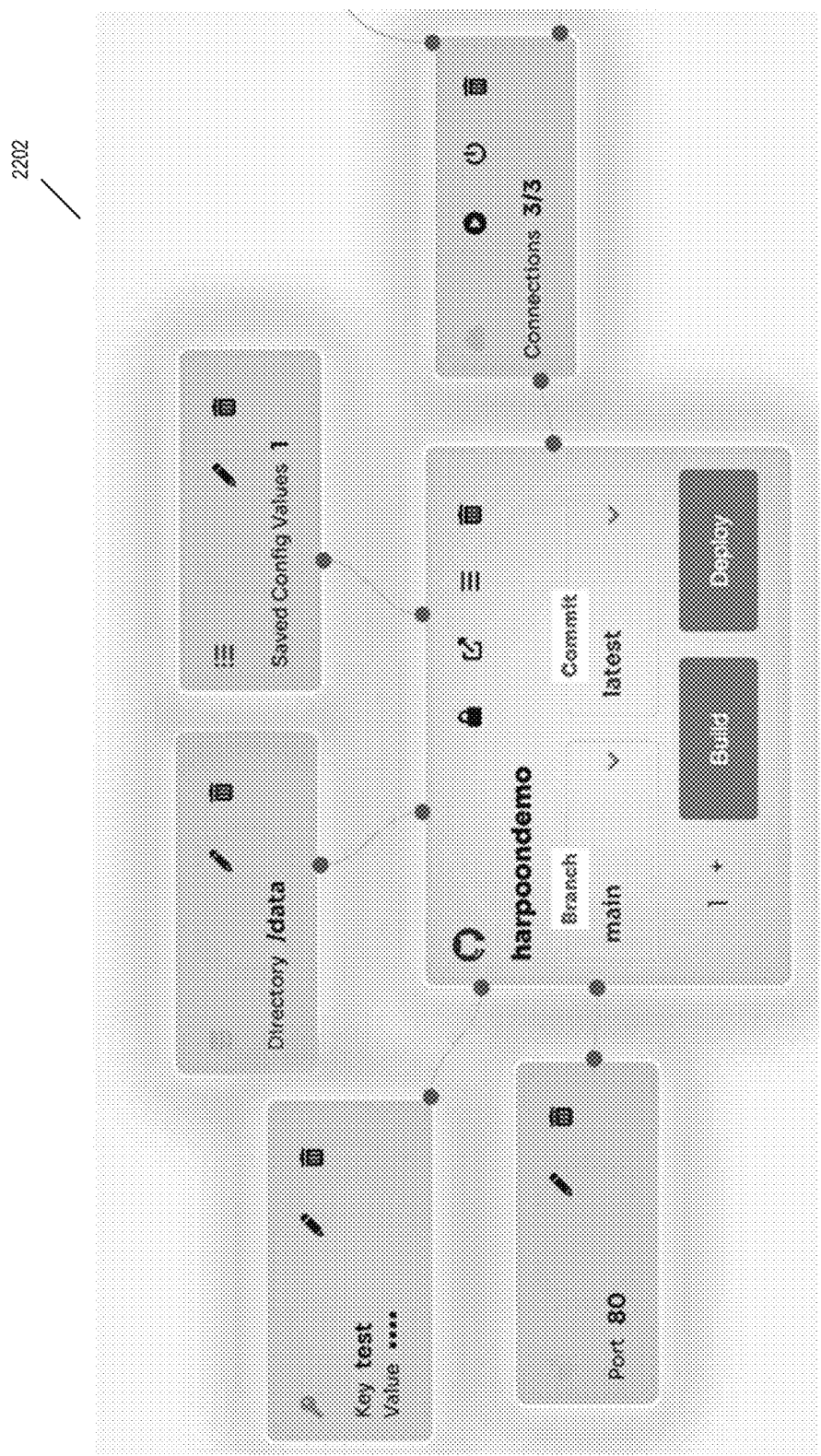

FIGS. 21 and 22 show screenshots 2102 and 2202 of the graphical user interface according to an example of the instant disclosure. FIG. 21 shows GITHUB, DOCKER, and HARBOR container elements with sidebar elements attached to the containers such as a Volume element, a ConfigMap element, an Ingress Route element, and a Secret element, among others. FIG. 22 shows another example with a GITHUB container element attached to a number of sidebar elements.

Figure 23:
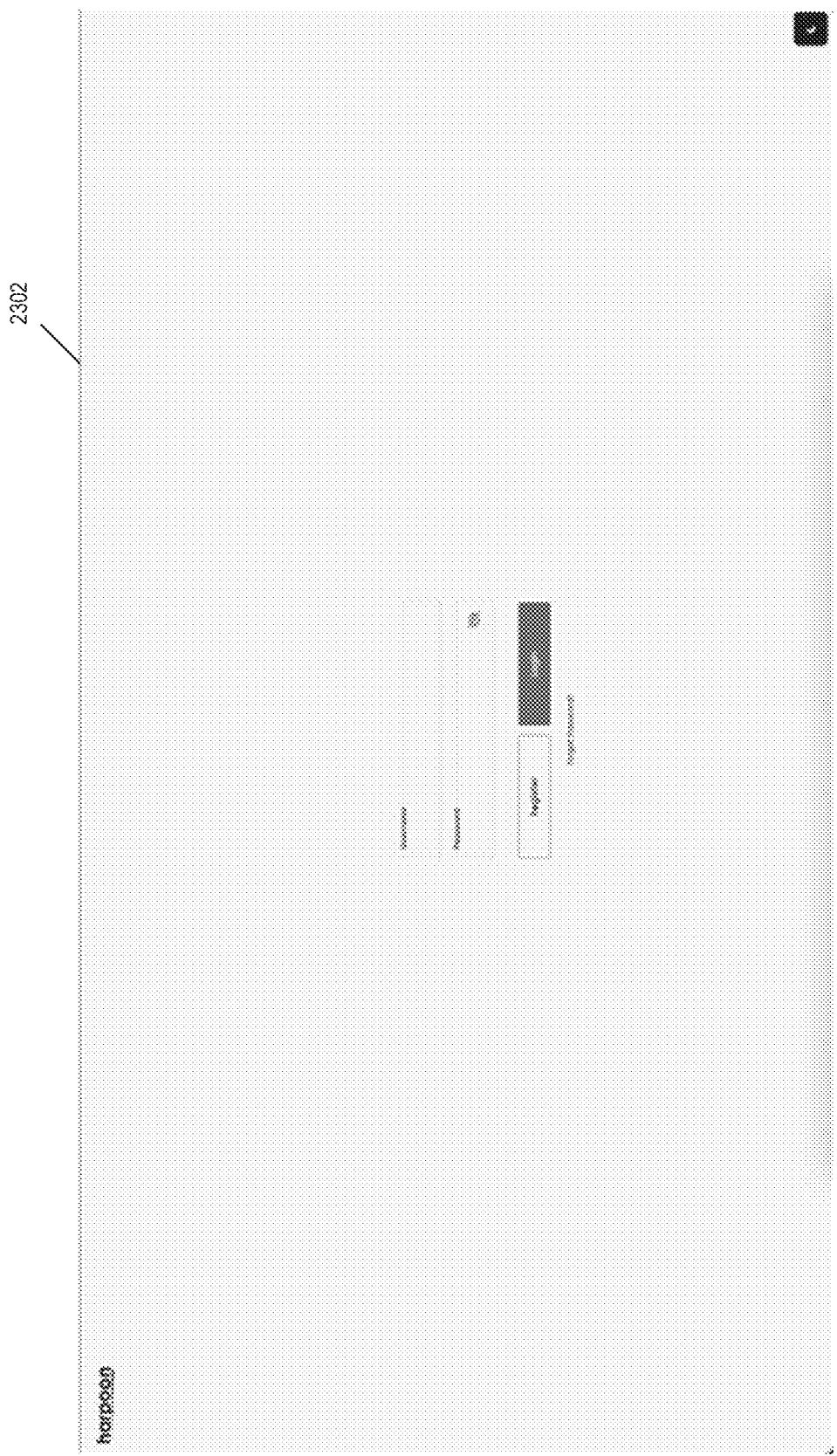

FIG. 23 shows a screenshot 2302 of a main graphical user interface according to an example of the instant disclosure. In particular, FIG. 23 shows an initial main user interface when a user is not logged into the server computing device 104.

Figure 24:
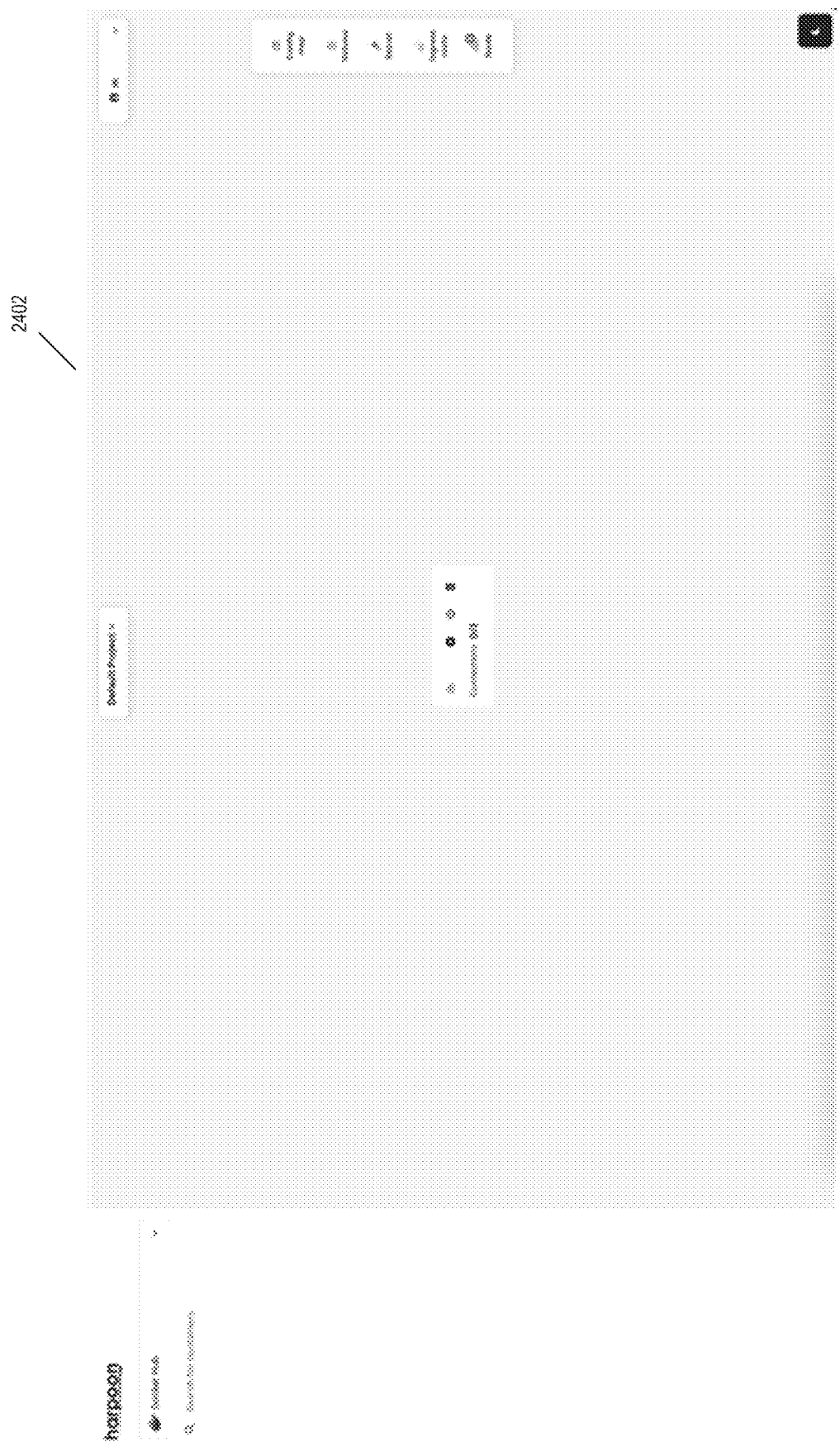

FIG. 24 shows a screenshot 2402 of a main graphical user interface according to an example of the instant disclosure. In particular, FIG. 24 shows an initial main user interface when a user is logged into the server computing device 104.

Figure 25:
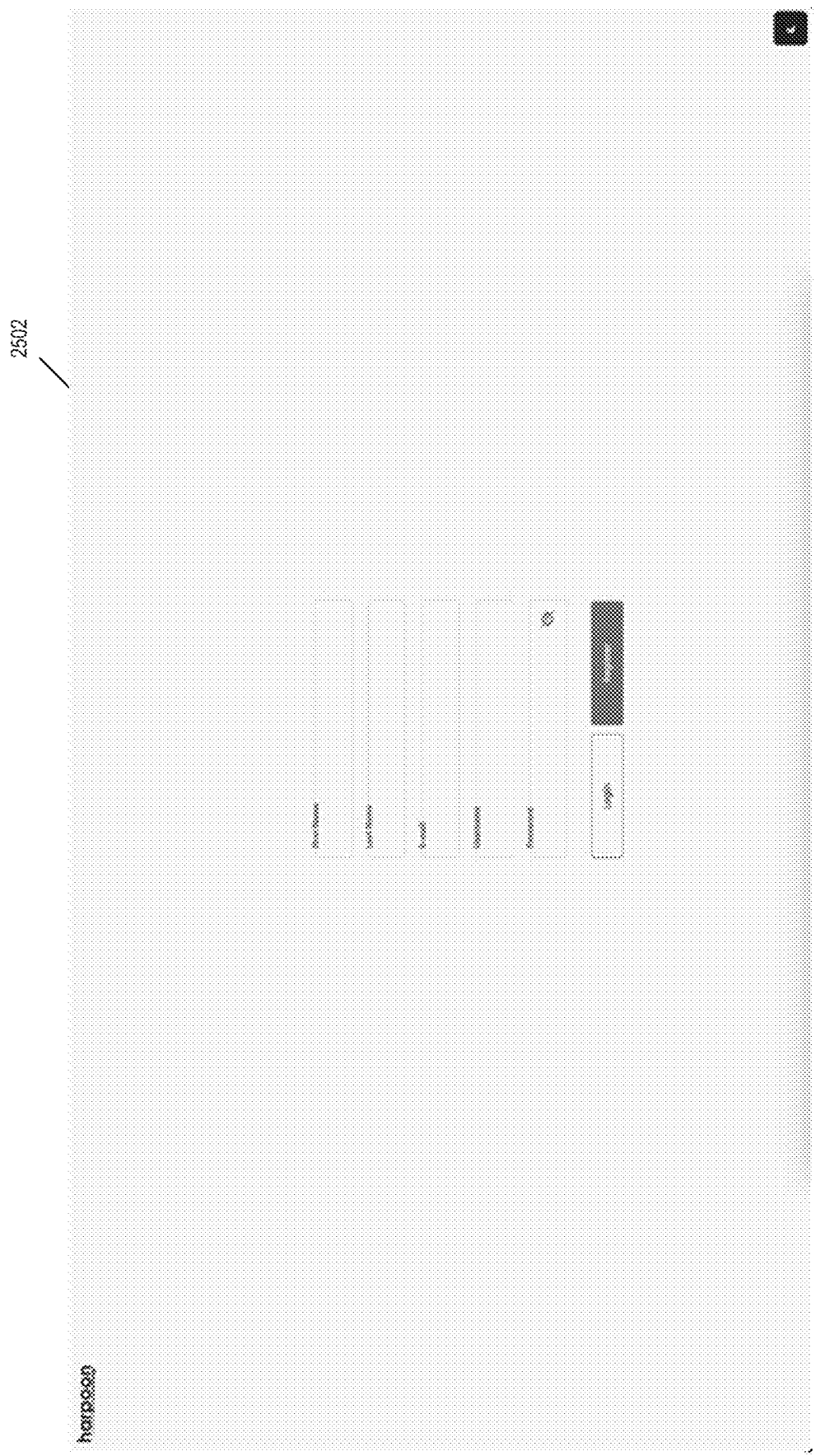

FIG. 25 shows a screenshot 2502 of a registration user interface according to an example of the instant disclosure. As shown in FIG. 25, the user may provide name information, an email address, a username, and a password to create a new account for use with the system. The client computing device 102 may send a representation of the name information, the email address, the username, and the password to the server computing device 104. The server computing device 104 may create a new user and send a response to the client computing device 102.

Figure 26:
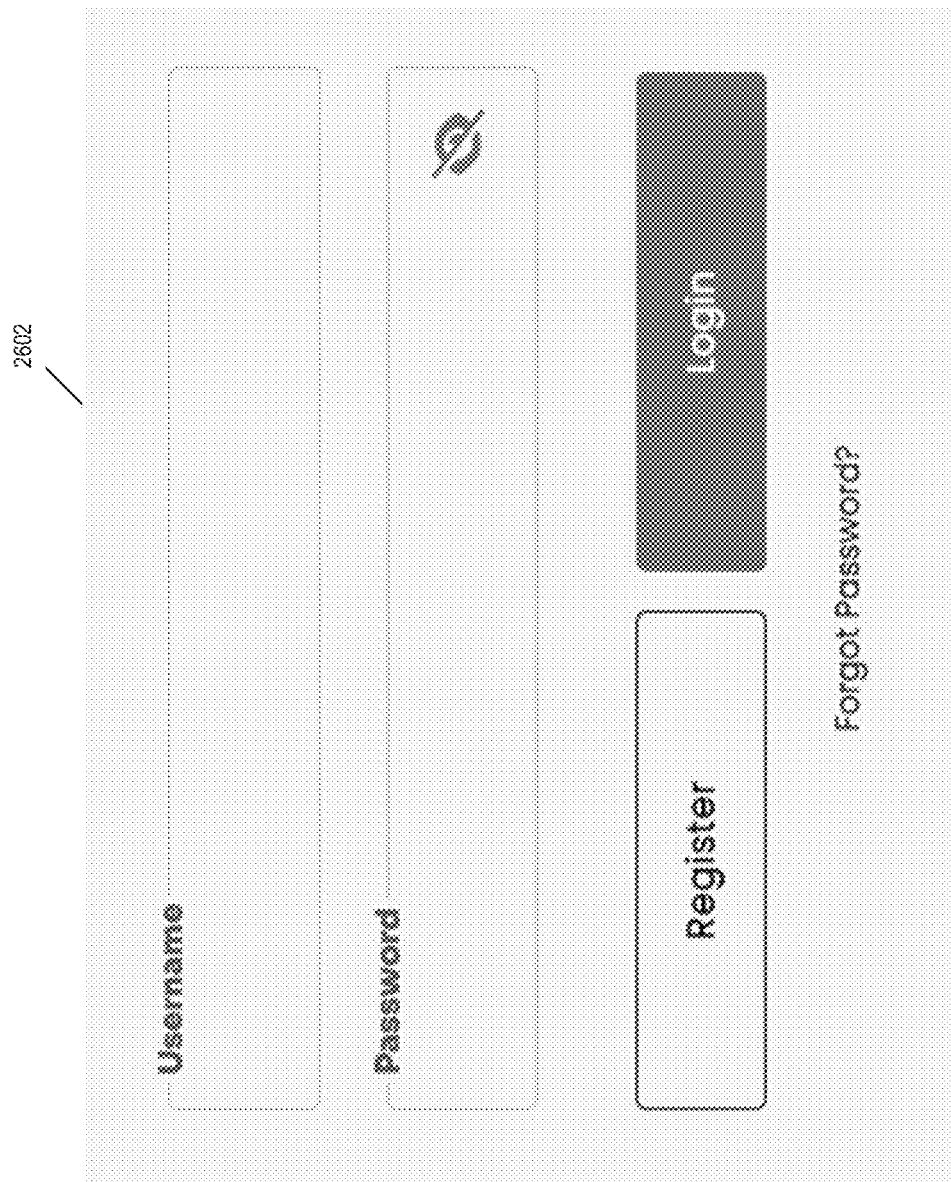

FIG. 26 shows a screenshot 2602 of a login user interface according to an example of the instant disclosure. As shown in FIG. 26, the user may login to the system by providing username information and password information. The client computing device 102 may send the representation of the username information and the password information to the server computing device 104 for authentication and access to the system.

Figure 27:
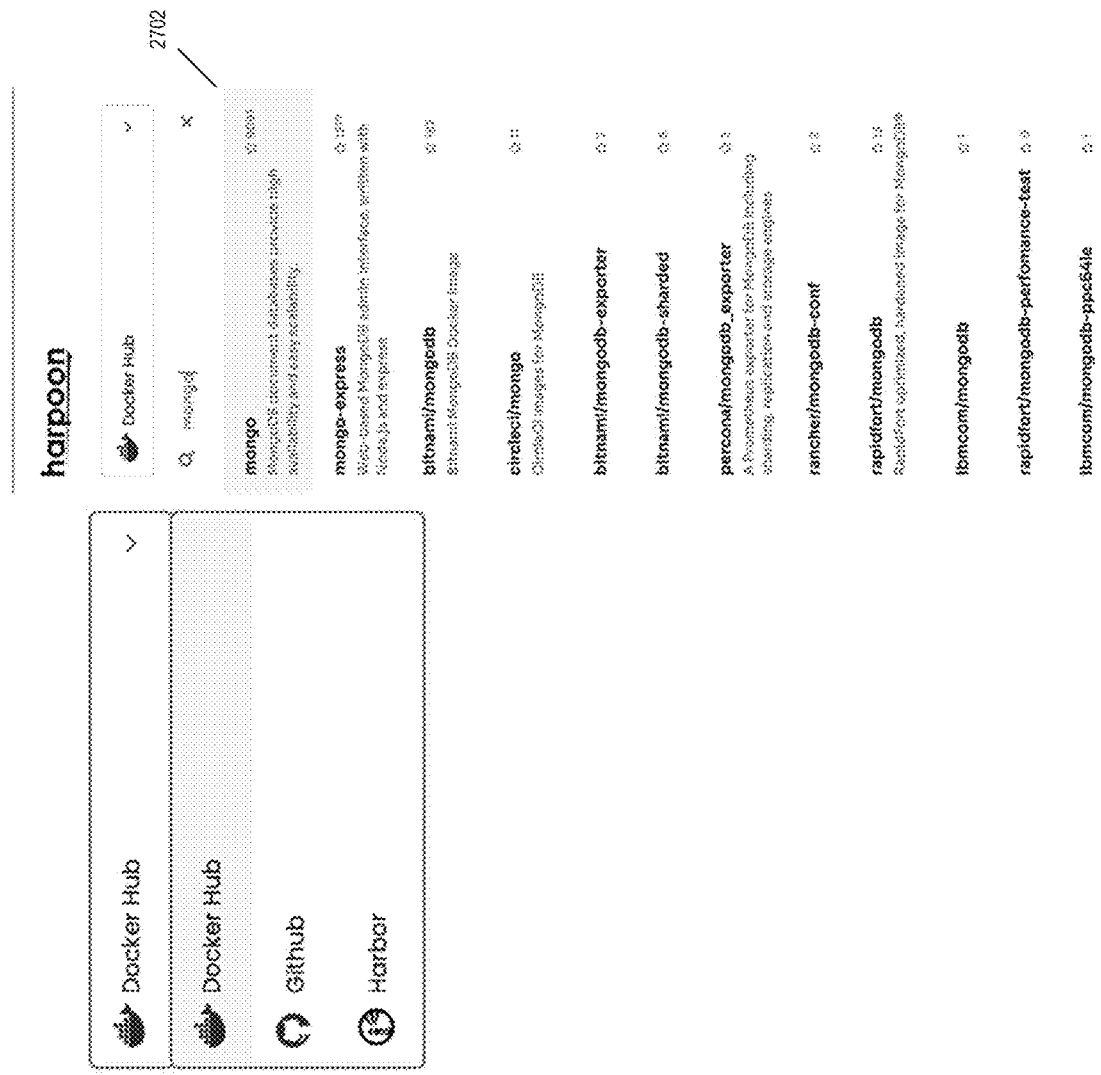
Figure 28:
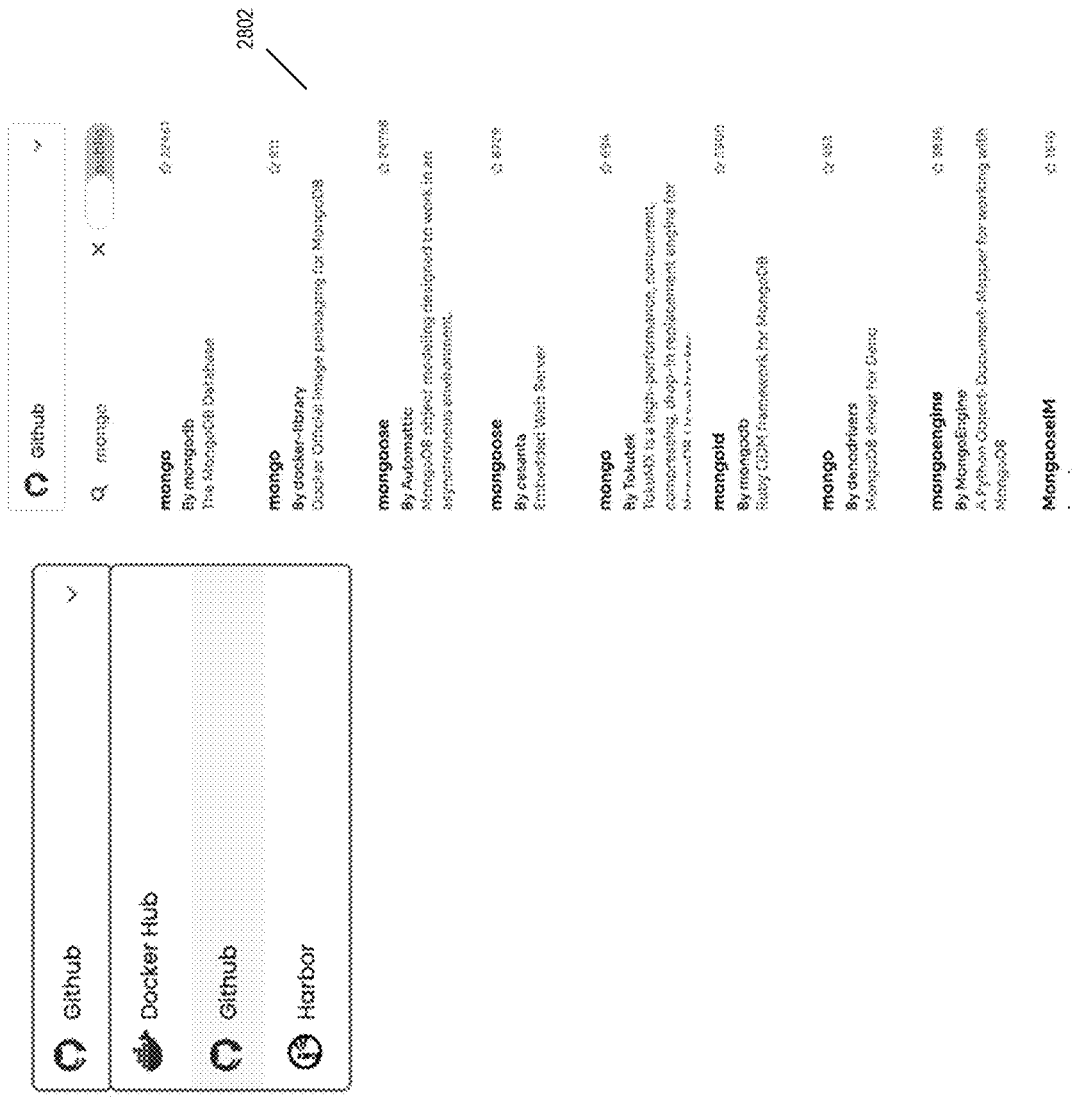
Figure 29:
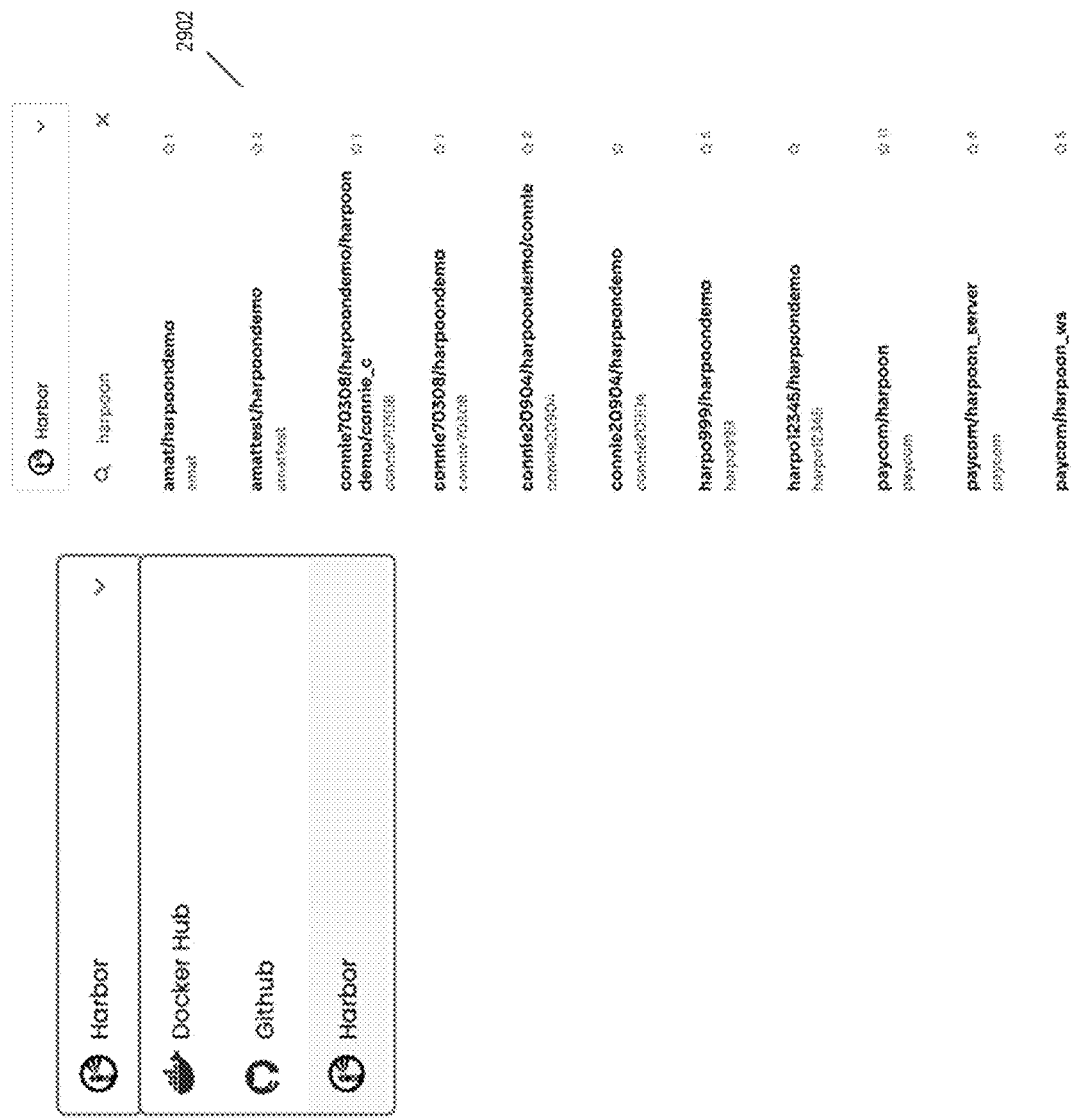

FIGS. 27, 28, and 29 show screenshots 2702, 2802, and 2902 of search user interfaces according to an example of the instant disclosure. As shown in FIGS. 27, 28, and 29 the user may search public and private Docker Hub, git, and private container repositories (such as Harbor) by providing a text-based search query. As shown in FIGS. 27, 28, and 29 the user may have linked a repository provider such as Docker Hub, Github, or Harbor, among others. When the user searches for a repository, the text string such as "mongo" may be used to send a request using APIs such as the Docker Hub API, GITHUB API, and/or Harbor API to find relevant repositories that may match the string. The text string may be combined with a token and sent to a server associated with Docker Hub using the Docker API, GITHUB using the GITHUB API, and Harbor using the Harbor API to allow searches of private and public repositories associated with the user account. When a response is received from the APIs, the server computing device 104 may send the response information to be displayed by the client computing device 102. The response may be received in JSON format and can be parsed for display by the client computing device 102. An example search of the Docker Hub is shown at 2702, an example search of GITHUB is shown at 2802, and an example search of Harbor is shown at 2902.

Figure 30:
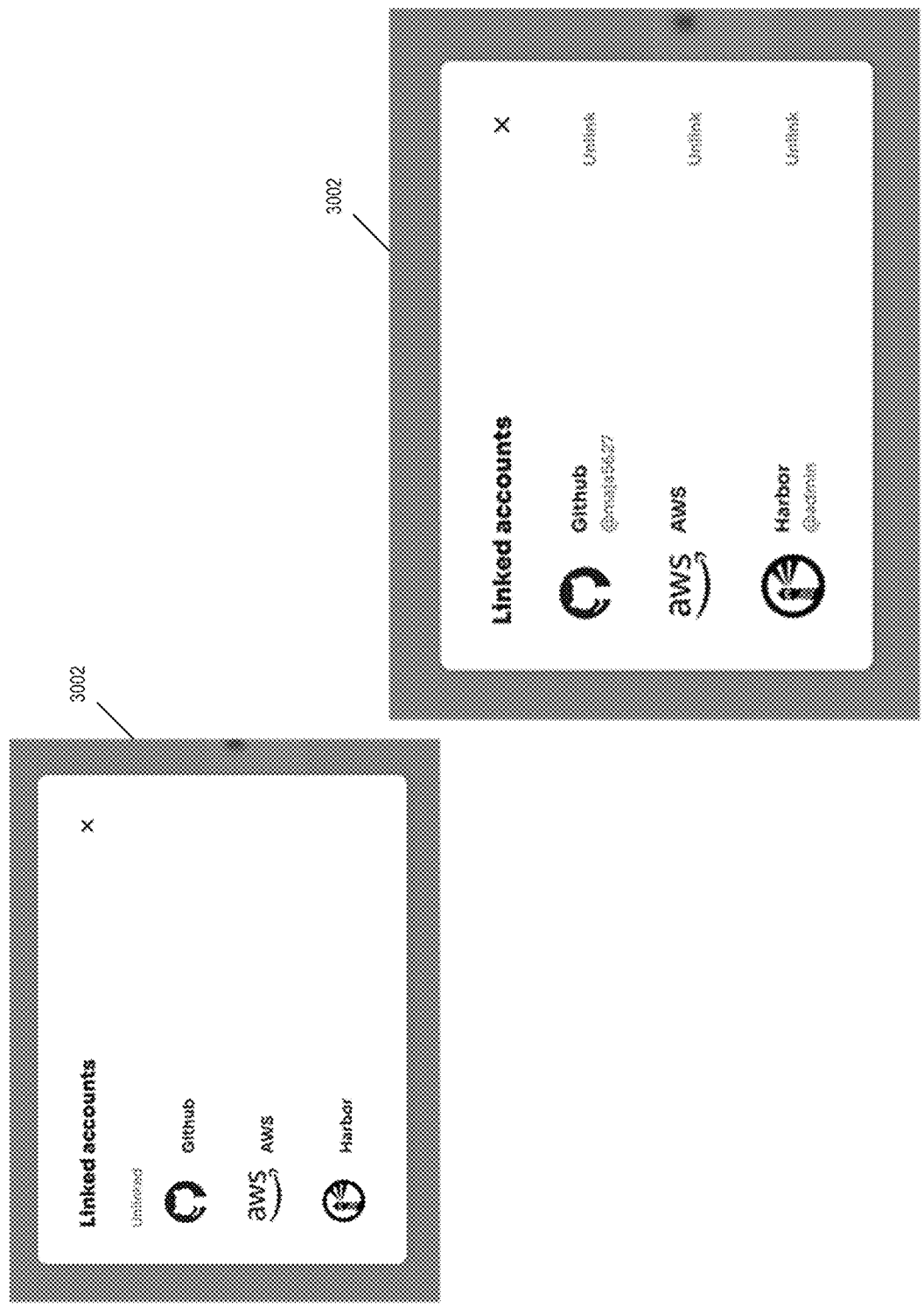
Figure 31:
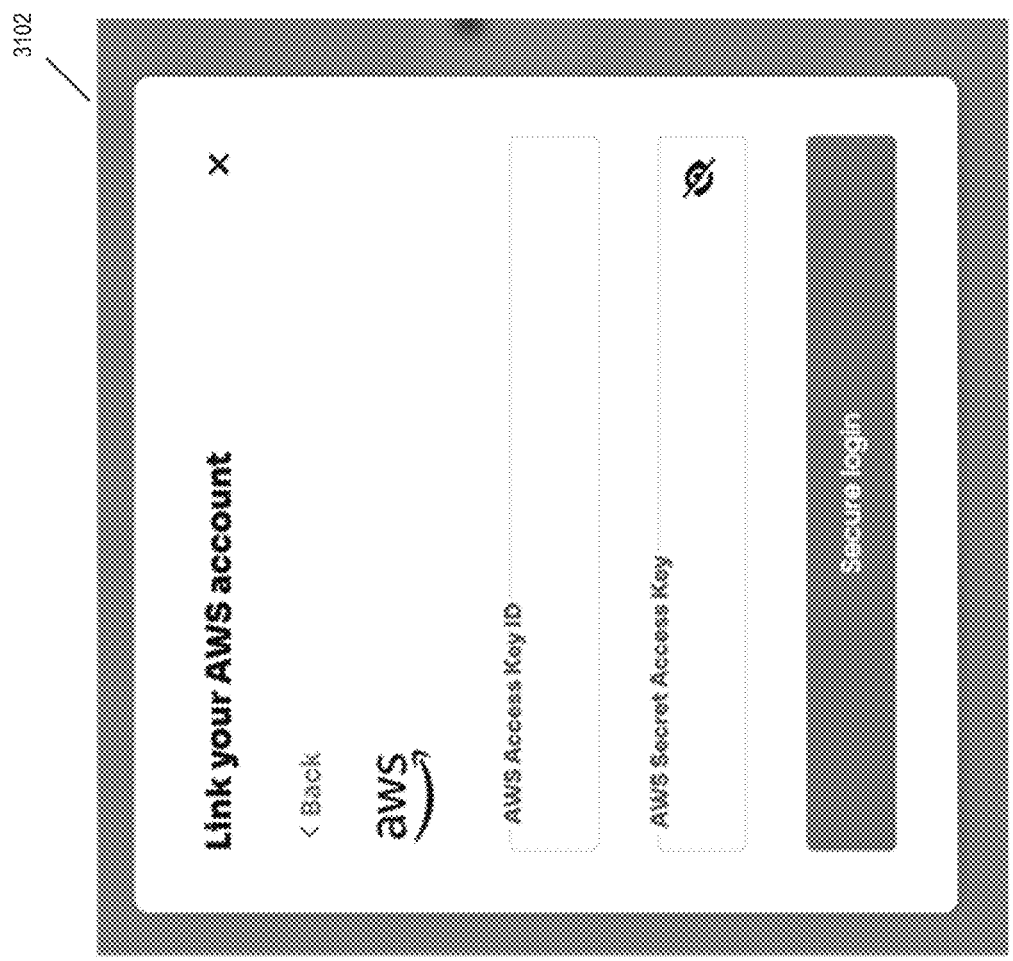
Figure 32:

FIGS. 30, 31, and 32 show screenshots 3002, 3102, and 3202 of a third-party account linking user interface according to an example of the instant disclosure. As shown in FIG. 30, the user may link with a Github account, AWS account, or Harbor account, or another third party account, among others. FIG. 31 shows that the user may link with an Amazon Web Services account by providing an Access Key ID as well as a Secret Access Key. FIG. 32 shows that the user may link with a Harbor account by providing a Harbor Username, a Harbor Password, and a Harbor URL and then selecting an Authenticate Harbor GUI element.

Figure 33:
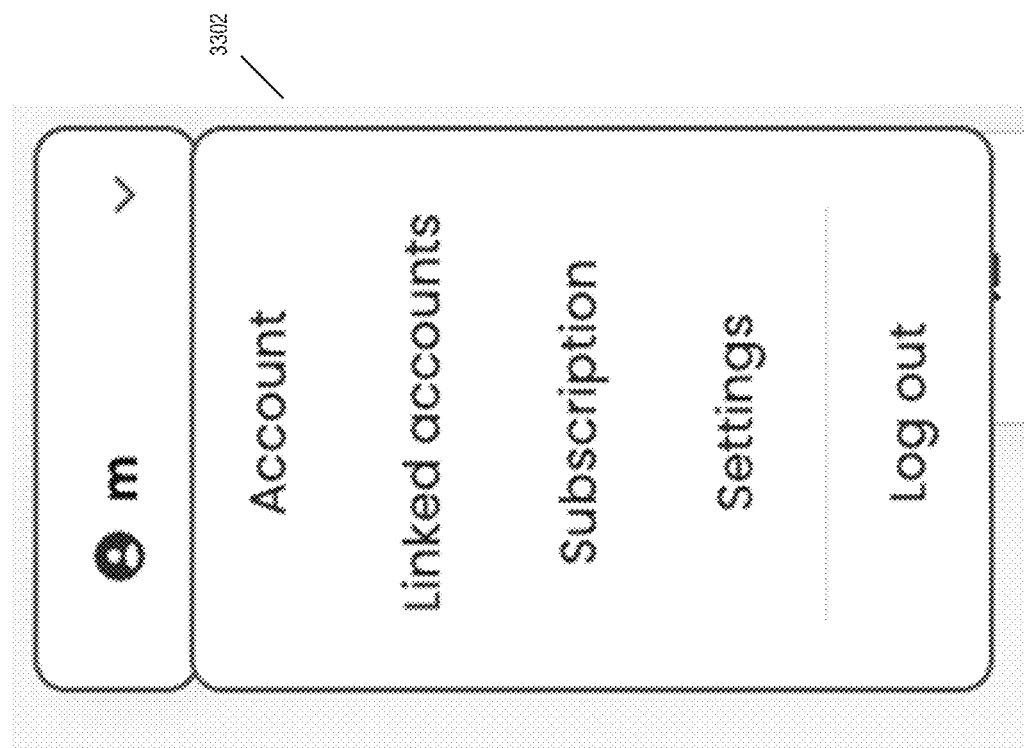

FIG. 33 shows a screenshot 3302 of a menu on a graphical user interface that allows a user to view Account information, view Linked Accounts, view Subscription information, view Settings information, and Log out according to an example of the instant disclosure.

Figure 34:
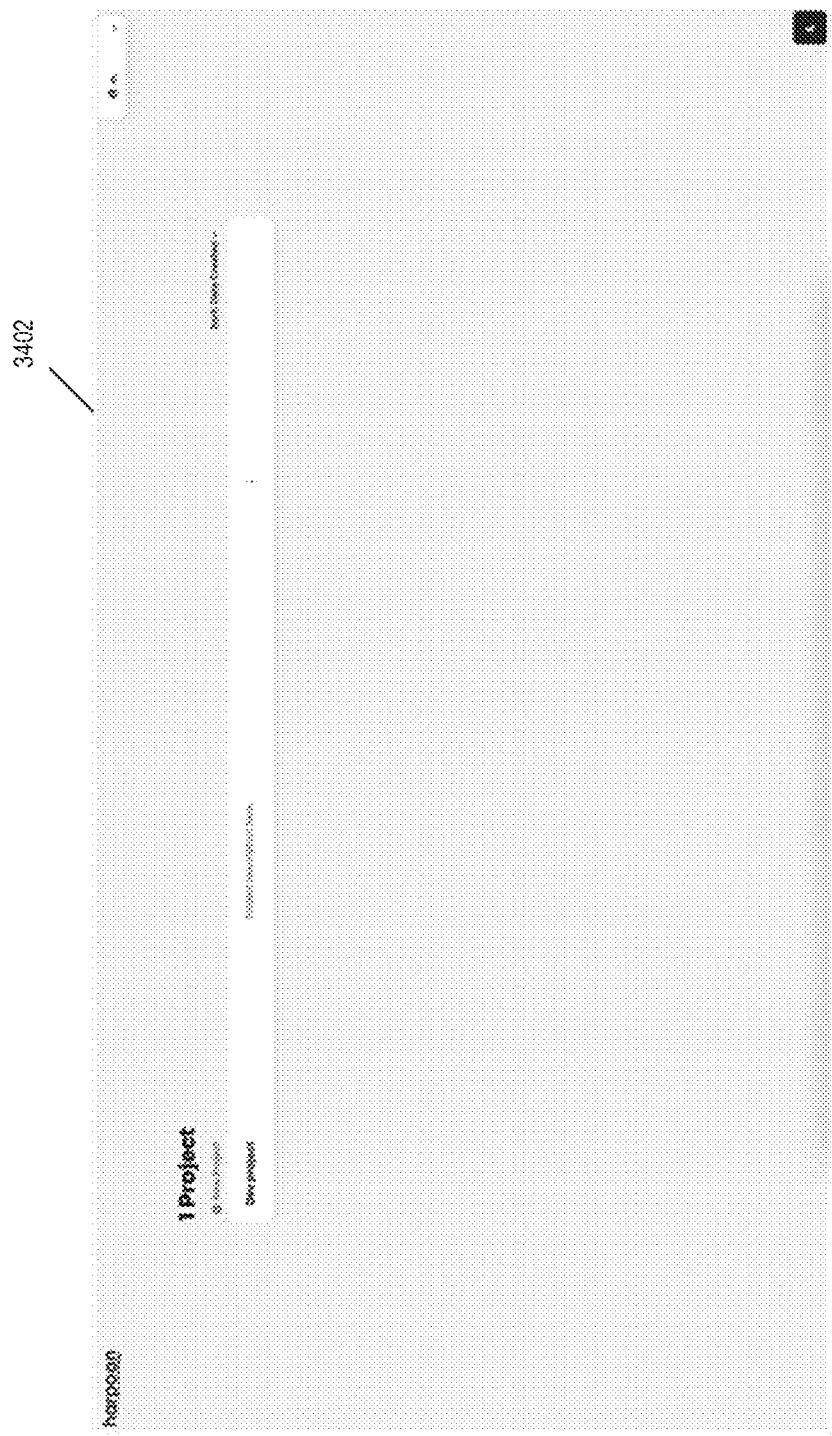

FIG. 34 shows screenshot 3402 of a graphical user interface that allows a user to view a project entitled Dev Project according to an example of the instant disclosure.

Figure 35:
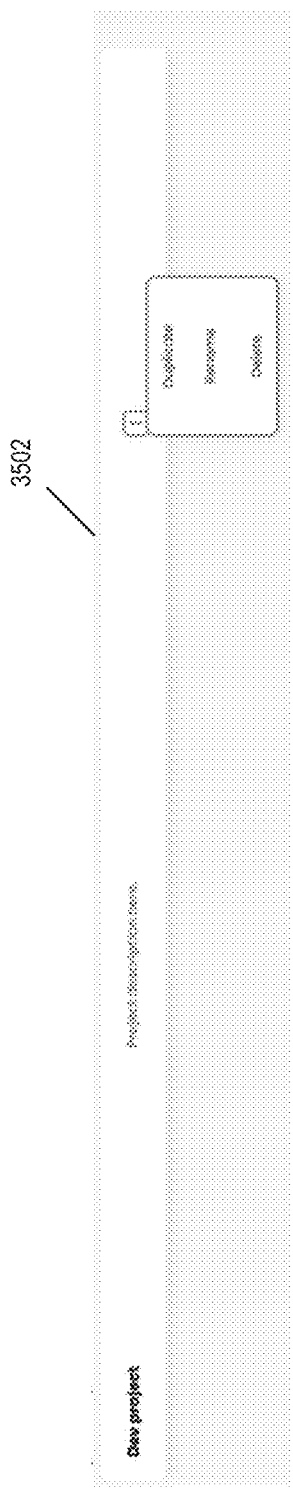

FIG. 35 shows a screenshot 3502 of a graphical user interface that allows a user to create a duplicate of a project, rename a project, or delete a project according to an example of the instant disclosure.

Figure 36:
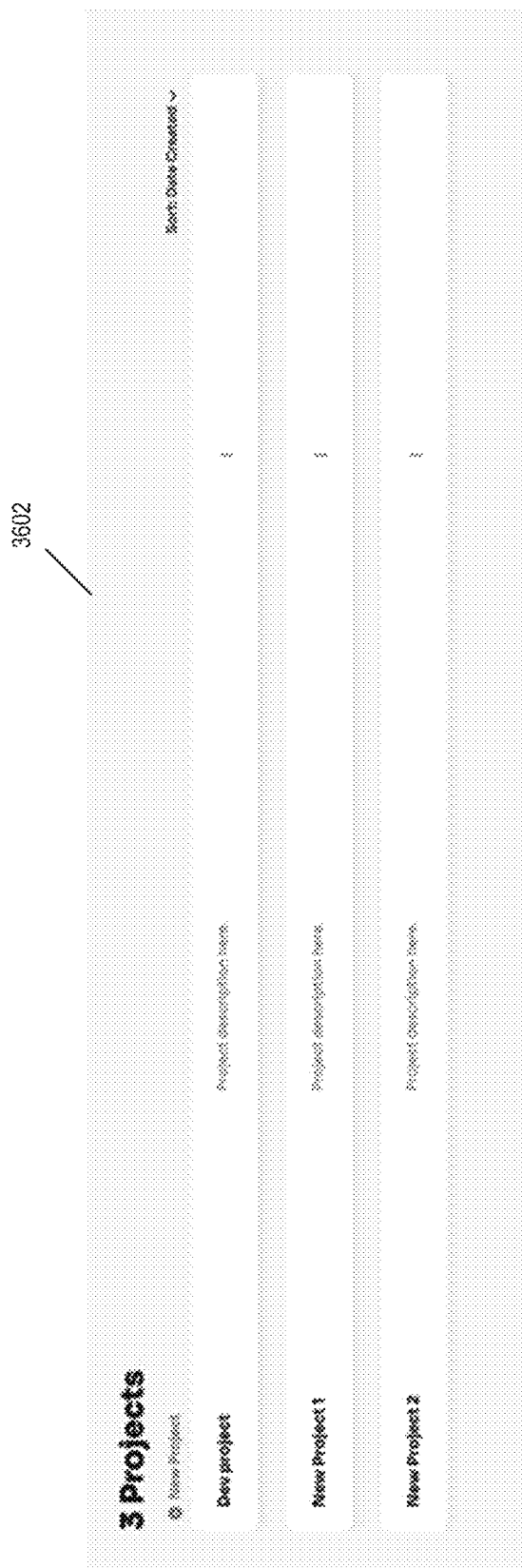

FIG. 36 shows a screenshot 3602 of a graphical user interface that allows a user to view one or more projects in a list associated with the system 100 according to an example of the instant disclosure. As shown in FIG. 36, there is a first project entitled "Dev Project," a second project entitled "New Project 1," and a third project entitled "New Project 2." Each project may have a project description and the user may sort the list of projects based on a number of factors such as a date of creation.

Figure 37:
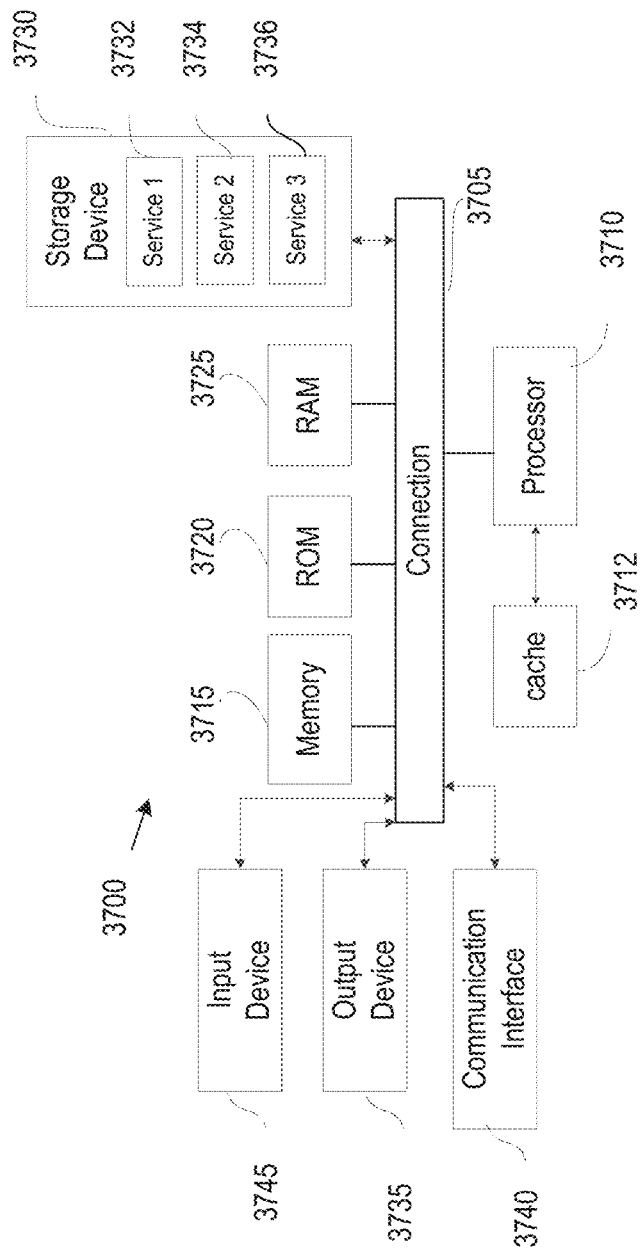
FIG. 37 shows an example of a system for implementing certain aspects of the present technology.

FIG. 37 shows an example of computing system 3700, which can be for example any computing device making up the computing device such as the client computing device 102, the server computing device 104, or any component thereof in which the components of the system are in communication with each other using connection 3705. Connection 3705 can be a physical connection via a bus, or a direct connection into processor 3710, such as in a chipset architecture. Connection 3705 can also be a virtual connection, networked connection, or logical connection.

In some embodiments, computing system 3700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 3700 includes at least one processing unit (CPU or processor) 3710 and connection 3705 that couples various system components including system memory 3715, such as read-only memory (ROM) 3720 and random access memory (RAM) 3725 to processor 3710. Computing system 3700 can include a cache of high-speed memory 3712 connected directly with, in close proximity to, or integrated as part of processor 3710.

Processor 3710 can include any general purpose processor and a hardware service or software service, such as services 3732, 3734, and 3736 stored in storage device 3730, configured to control processor 3710 as well as a special-purpose processor where software instructions are incorporated into the actual processor design. Processor 3710 may essentially be a completely self-contained computing system, containing multiple cores or processors, a bus, memory controller, cache, etc. A multi-core processor may be symmetric or asymmetric.

To enable user interaction, computing system 3700 includes an input device 3745, which can represent any number of input mechanisms, such as a microphone for speech, a touch-sensitive screen for gesture or graphical input, keyboard, mouse, motion input, speech, etc. Computing system 3700 can also include output device 3735, which can be one or more of a number of output mechanisms known to those of skill in the art. In some instances, multimodal systems can enable a user to provide multiple types of input/output to communicate with computing system 3700. Computing system 3700 can include communications interface 3740, which can generally govern and manage the user input and system output. There is no restriction on operating on any particular hardware arrangement, and therefore the basic features here may easily be substituted for improved hardware or firmware arrangements as they are developed.

Storage device 3730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 3730 can include software services, servers, services, etc., that when the code that defines such software is executed by the processor 3710, it causes the system to perform a function. In some embodiments, a hardware service that performs a particular function can include the software component stored in a computer-readable medium in connection with the necessary hardware components, such as processor 3710, connection 3705, output device 3735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a memory storing computer-readable instructions; and at least one processor to execute the instructions to receive a request to set up a computing cluster comprising at least one node, the request comprising a selection of a node graphical user interface element that represents at least one virtual machine associated with at least one of at least one cloud service provider and at least one on-premise computing device, dynamically generate a configuration file comprising configuration language to set up the computing cluster comprising the at least one node, parse the configuration file to convert the configuration file into at least one application programming interface (API) request and send the at least one API request to at least one of the at least one cloud service provider and the at least one on-premise computing device to set up the computing cluster, receive real-time deployment information from at least one of the at least one service provider and the at least one on-premise computing device, and transmit status information associated with the computing cluster for display.

Aspect 2: The system of Aspect 1, wherein the configuration file comprises a HashiCorp Configuration Language (HCL) configuration file.

Aspect 3: The system of Aspects 1 and 2, wherein the computing cluster comprises a Kubernetes cluster.

Aspect 4: The system of Aspects 1 to 3, the at least one processor further to initiate a script based on the configuration file.

Aspect 5: The system of Aspects 1 to 4, the at least one processor further to receive a request to set up at least one of a git element and a container element and attach the at least one of the git element and the container element to the node graphical user interface element.

Aspect 6: The system of Aspects 1 to 5, wherein the container element comprises a visual representation of a container image to be deployed to the computing cluster.

Aspect 7: The system of Aspects 1 to 6, wherein the git element is associated with a git repository and is built with a text-based set of instructions.

Aspect 8: The system of Aspects 1 to 7, the at least one processor further to receive a request to attach the node graphical user interface element with at least one other element using a link graphical user interface element that is dragged from the node graphical user interface element to the at least one other element.

Aspect 9: The system of Aspects 1 to 8, the at least one processor further to receive a request to set up a ConfigMap element and attach the ConfigMap element to the at least one of the git element and the container element.

Aspect 10: The system of Aspects 1 to 9, the at least one processor further to receive a request to set up a volume element comprising a Kubernetes Persistent Volume Claim (PVC).

Aspect 11: The system of Aspects 1 to 10, the at least one processor further to receive a request to set up an ingress route element comprising a Kubernetes Ingress Route that is attached to the at least one of the git element and the container element.

Aspect 12: The system of Aspects 1 to 11, the at least one processor further to receive a request to set up a secret element comprising a Kubernetes secrets storage that is attached to the at least one of the git element and the container element.

Aspect 13: The system of Aspects 1 to 12, the at least one processor further to display a log associated with the computing cluster.

Aspect 14: The system of Aspects 1 to 13, wherein the status information comprises a particular color of the node graphical user interface element.

Aspect 15: The system of Aspects 1 to 14, wherein the particular color comprises one of translucent that indicates no status, yellow that indicates in progress, blue that indicates successful deployment, and red that indicates failed deployment.

Aspect 16: The system of Aspects 1 to 15, the at least one processor further to receive a selection of a new project user interface element and associate the at least one node with a new project.

Aspect 17: A method comprising receiving, by at least one processor, a request to set up a computing cluster comprising at least one node, the request comprising a selection of a node graphical user interface element that represents at least one virtual machine associated with at least one of at least one cloud service provider and at least one on-premise computing device, dynamically generating, by the at least one processor, a configuration file comprising configuration language to set up the computing cluster comprising the at least one node, parsing, by the at least one processor, the configuration file to convert the configuration file into at least one application programming interface (API) request and sending the at least one API request to at least one of the at least one cloud service provider and the at least one on-premise computing device to set up the computing cluster, receiving, by the at least one processor, real-time deployment information from at least one of the at least one service provider and the at least one on-premise computing device, and transmitting, by the at least one processor, status information associated with the computing cluster for display.

Aspect 18: The method of Aspect 17, wherein the configuration file comprises a HashiCorp Configuration Language (HCL) configuration file.

Aspect 19: A non-transitory computer-readable storage medium comprising instructions stored thereon that, when executed by a computing device cause the computing device to perform operations, the operations comprising receiving a request to set up a computing cluster comprising at least one node, the request comprising a selection of a node graphical user interface element that represents at least one virtual machine associated with at least one of at least one cloud service provider and at least one on-premise computing device, dynamically generating a configuration file comprising configuration language to set up the computing cluster comprising the at least one node, parsing the configuration file to convert the configuration file into at least one application programming interface (API) request and sending the at least one API request to at least one of the at least one cloud service provider and the at least one on-premise computing device to set up the computing cluster, receiving real-time deployment information from at least one of the at least one service provider and the at least one on-premise computing device, and transmitting status information associated with the computing cluster for display.

Aspect 20: The non-transitory computer-readable storage medium of Aspect 19, wherein the configuration file comprises a HashiCorp Configuration Language (HCL) configuration file.

What is claimed is:

1. A system comprising:
   a memory storing computer-readable instructions; and
   at least one processor to execute the instructions to:
   receive a codeless request to set up a computing cluster comprising at least one node, the codeless request comprising a selection of a node graphical user interface element using an infrastructure visual display (IVD) that represents at least one virtual machine associated with at least one of at least one cloud service provider and at least one on-premise computing device, the selection comprising attaching at least one container to the node graphical user interface element to setup the cluster and the at least one virtual machine associated with at least one of at least one cloud service provider and at least one on-premise computing device;
   dynamically generate a configuration file comprising configuration language to set up the computing cluster comprising the at least one node;
   parse the configuration file to convert the configuration file to dynamically autogenerate at least one manifest comprising a desired state of objects associated with the computing cluster comprising the at least one node and insert the at least one manifest into at least one application programming interface (API) request and send the at least one API request to the at least one of the at least one cloud service provider and the at least one on-premise computing device to set up the computing cluster by injecting input that initiates at least one script to copy files into a temporary directory, injecting a saved state, setting up environment variables, and interacting with the at least one of the at least one cloud service provider and the at least one on-premise computing device to set up the computing cluster to provision volumes, services, and cloud services in the computing cluster;
   receive real-time deployment information from the at least one of the at least one service provider and the at least one on-premise computing device; and transmit status information associated with the computing cluster for display.

2. The system of claim 1, wherein the configuration file comprises a HashiCorp Configuration Language (HCL) configuration file.

3. The system of claim 1, wherein the computing cluster comprises a Kubernetes cluster.

4. The system of claim 1, the at least one processor further to receive a request to set up at least one of a git element and a container element and attach the at least one of the git element and the container element to the node graphical user interface element.

5. The system of claim 4, wherein the container element comprises a visual representation of a container image to be deployed to the computing cluster.

6. The system of claim 4, wherein the git element is associated with a git repository and is built with a text-based set of instructions.

7. The system of claim 4, the at least one processor further to receive a request to set up a ConfigMap element and attach the ConfigMap element to the at least one of the git element and the container element.

8. The system of claim 4, the at least one processor further to receive a request to set up an ingress route element comprising a Kubernetes Ingress Route that is attached to the at least one of the git element and the container element.

9. The system of claim 4, the at least one processor further to receive a request to set up a secret element comprising a Kubernetes secrets storage that is attached to the at least one of the git element and the container element.

10. The system of claim 1, the at least one processor further to receive a request to attach the node graphical user interface element with at least one other element using a link graphical user interface element that is dragged from the node graphical user interface element to the at least one other element.

11. The system of claim 1, the at least one processor further to receive a request to set up a volume element comprising a Kubernetes Persistent Volume claim (PVC).

12. The system of claim 1, the at least one processor further to display a log associated with the computing cluster.

13. The system of claim 1, wherein the status information comprises a particular color of the node graphical user interface element.

14. The system of claim 13, wherein the particular color comprises one of translucent that indicates no status, yellow that indicates in progress, blue that indicates successful deployment, and red that indicates failed deployment.

15. The system of claim 1, the at least one processor further to receive a selection of a new project user interface element and associate the at least one node with a new project.

16. A method, comprising:
receiving, by at least one processor, a codeless request to set up a computing cluster comprising at least one node, the codeless request comprising a selection of a node graphical user interface element using an infrastructure visual display (IVD) that represents at least one virtual machine associated with at least one of at least one cloud service provider and at least one on-premise computing device, the selection comprising attaching at least one container to the node graphical user interface element to setup the cluster and the at least one virtual machine associated with at least one of at least one cloud service provider and at least one on-premise computing device;

dynamically generating, by the at least one processor, a configuration file comprising configuration language to set up the computing cluster comprising the at least one node;

parsing, by the at least one processor, the configuration file to convert the configuration file to dynamically autogenerate at least one manifest comprising a desired state of objects associated with the computing cluster comprising the at least one node and insert the at least one manifest into at least one application programming interface (API) request and sending the at least one API request to the at least one of the at least one cloud service provider and the at least one on-premise computing device to set up the computing cluster by injecting input that initiates at least one script to copy files into a temporary directory, injecting a saved state, setting up environment variables, and interacting with the at least one of the at least one cloud service provider and the at least one on-premise computing device to set up the computing cluster to provision volumes, services, and cloud services in the computing cluster;

receiving, by the at least one processor, real-time deployment information from the at least one of the at least one service provider and the at least one on-premise computing device; and transmitting, by the at least one processor, status information associated with the computing cluster for display.

17. The method of claim 16, wherein the configuration file comprises a HashiCorp Configuration Language (HCL) configuration file.

18. A non-transitory computer-readable storage medium comprising instructions stored thereon that, when executed by a computing device cause the computing device to perform operations, the operations comprising:
receiving a codeless request to set up a computing cluster comprising at least one node, the codeless request comprising a selection of a node graphical user interface element using an infrastructure visual display (IVD) that represents at least one virtual machine associated with at least one of at least one cloud service provider and at least one on-premise computing device, the selection comprising attaching at least one container to the node graphical user interface element to setup the cluster and the at least one virtual machine associated with at least one of at least one cloud service provider and at least one on-premise computing device;

dynamically generating a configuration file comprising configuration language to set up the computing cluster comprising the at least one node;

parsing the configuration file to convert the configuration file to dynamically autogenerate at least one manifest comprising a desired state of objects associated with the computing cluster comprising the at least one node and insert the at least one manifest into at least one application programming interface (API) request and sending the at least one API request to the at least one of the at least one cloud service provider and the at least one on-premise computing device to set up the computing cluster by injecting input that initiates at least one script to copy files into a temporary directory, injecting a saved state, setting up environment variables, and interacting with the at least one of the at least one cloud service provider and the at least one on-premise computing device to set up the computing cluster to provision volumes, services, and cloud services in the computing cluster;

receiving real-time deployment information from the at least one of the at least one service provider and the at least one on-premise computing device; and transmitting status information associated with the computing cluster for display.

19. The non-transitory computer-readable storage medium of claim 18, wherein the configuration file comprises a HashiCorp Configuration Language (HCL) configuration file.

* * * * *